US012756512B2

(12) United States Patent
Park et al.

(10) Patent No.: US 12,756,512 B2

(45) Date of Patent: Oct. 6, 2026

(54) ELECTRONIC DEVICE, AND METHOD BY WHICH ELECTRONIC DEVICE TRANSMITS REFERENCE SIGNAL

(71) Applicant: Samsung Electronics Co., Ltd., Suwon-si (KR)

(72) Inventors: Sungchul Park, Suwon-si (KR); Euichang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 542 days.

(21) Appl. No.: 18/363,211

(22) Filed: Aug. 1, 2023

(65) Prior Publication Data

US 2023/0379113 A1 Nov. 23, 2023

Related U.S. Application Data

(63) Continuation of application No. PCT/KR2022/001361, filed on Jan. 26, 2022.

(30) Foreign Application Priority Data

Feb. 1, 2021 (KR) ........................ 10-2021-0014042

(51) Int. Cl.

*H04W 72/044* (2023.01)
*H04L 5/00* (2006.01)
*H04W 72/1268* (2023.01)

(52) U.S. Cl.

CPC ......... *H04L 5/0048* (2013.01); *H04W 72/046* (2013.01); *H04W 72/1268* (2013.01)

(58) Field of Classification Search

CPC ............ H04W 72/046; H04W 72/1268; H04L 5/0048

See application file for complete search history.

(56) References Cited

U.S. PATENT DOCUMENTS

2011/0058505 A1 3/2011 Pan et al.
2012/0129561 A1 5/2012 Peng et al.

(Continued)

FOREIGN PATENT DOCUMENTS

CN 110224706 A 9/2019
KR 20110008303 A 1/2011

(Continued)

OTHER PUBLICATIONS

Korean Office Action dated May 12, 2025 for KR Application No. 10-2021-0014042.

(Continued)

*Primary Examiner* — Kent Krueger

(74) *Attorney, Agent, or Firm* — NIXON & VANDERHYE P.C.

(57) ABSTRACT

An electronic device according to an embodiment may include: a communication processor; at least one radio frequency integrated circuit (RFIC); a first antenna group including a plurality of antennas for transmitting or receiving data of a first communication network; and a second antenna group including a plurality of antennas for transmitting or receiving data of a second communication network, wherein the communication processor may be configured to control to: receive, from a first base station corresponding to the first communication network or a second base station corresponding to the second communication network, first information related to the transmission time of a reference signal transmitted to the first base station; receive, from the second base station, second information related to the time at which the data of the second communication network is transmitted and received; and select a first antenna adjacent to a second antenna from among the plurality of antennas of the first antenna group at the time at which uplink data is transmitted to the second base station (Continued)

through a second antenna of the second antenna group on the basis of the received first information and the received second information, so as to transmit the reference signal to the first base station.

20 Claims, 23 Drawing Sheets

(56) References Cited

U.S. PATENT DOCUMENTS

| | | | |
|---|---|---|---|
| 2012/0327914 | A1 | 12/2012 | Kang et al. |
| 2013/0016635 | A1 | 1/2013 | Linsky et al. |
| 2013/0260687 | A1 | 10/2013 | Paycher et al. |
| 2014/0098837 | A1 | 4/2014 | Mehta et al. |
| 2016/0029262 | A1 | 1/2016 | Heo et al. |
| 2018/0132210 | A1* | 5/2018 | Rico Alvarino ...... H04L 5/0053 |
| 2019/0052328 | A1 | 2/2019 | Akula et al. |
| 2019/0253214 | A1 | 8/2019 | Liu et al. |
| 2019/0305918 | A1 | 10/2019 | Siomina et al. |
| 2019/0312704 | A1 | 10/2019 | Rico Alvarino et al. |
| 2019/0356431 | A1 | 11/2019 | Manolakos et al. |
| 2020/0106646 | A1 | 4/2020 | Liu et al. |
| 2020/0204323 | A1 | 6/2020 | Kim et al. |
| 2020/0204407 | A1 | 6/2020 | Liu et al. |
| 2020/0221309 | A1* | 7/2020 | Ozturk .................. H04W 16/14 |
| 2020/0267026 | A1* | 8/2020 | Manolakos ........... H04W 72/23 |
| 2020/0305013 | A1 | 9/2020 | Nurminen et al. |
| 2020/0313815 | A1* | 10/2020 | Sridharan ............ H04B 7/0404 |
| 2020/0413488 | A1 | 12/2020 | Han et al. |

FOREIGN PATENT DOCUMENTS

| | | | |
|---|---|---|---|
| KR | 101557795 | B1 | 10/2015 |
| KR | 101862839 | B1 | 5/2018 |
| KR | 20200119260 | A | 10/2020 |

OTHER PUBLICATIONS

European Search Report dated May 8, 2024 for EP Application No. 22746215.7.

Extended European Search Report dated Jul. 29, 2024 for EP Application No. 22746215.7.

International Search Report for PCT/KR2022/001361 mailed May 3, 2022, 2 pages.

Written Opinion of the ISA for PCT/KR2022/001361 mailed May 3, 2022, 5 pages.

* cited by examiner

| NR Slot | 61 | 62 | 63 | 64 | 65 | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|---|---|---|---|---|
| LTE TDD | D | S | U | D | D | D | D | D | D | D | D | S | U | D | D | D | D | D | D | D |
| NR SRS | | | ant #1 | | | | | ant #2 | | | | | ant #3 | | | | | ant #4 | | |

FIG. 11

| NR Slot | 61 | 62 | 63 | 64 | 65 | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|---|---|---|---|---|
| LTE TDD | D | S | U | D | D | D | D | D | D | D | D | S | U | D | D | D | D | D | D | D |
| NR SRS | | | ant #2 | | | | | ant #3 | | | | | ant #4 | | | | | ant #1 | | |

FIG. 13

ELECTRONIC DEVICE, AND METHOD BY WHICH ELECTRONIC DEVICE TRANSMITS REFERENCE SIGNAL

CROSS REFERENCE TO RELATED APPLICATIONS

This application is a continuation of International Application No. PCT/KR2022/001361 filed on Jan. 26, 2022, designating the United States, in the Korean Intellectual Property Receiving Office, and claiming priority to Korean Patent Application No. 10-2021-0014042 filed on Feb. 1, 2021, the disclosures of which are all hereby incorporated by reference herein in their entireties.

BACKGROUND

Field

Various example embodiments relate to an electronic device and/or a method for transmitting a reference signal by an electronic device.

Description of Related Art

In line with recent development of mobile communication technologies, portable terminals configured to provide various functions have been widely used, and there have been efforts to develop improved 5G communication systems to satisfy wireless data traffic demands that have been increasing. In order to accomplish higher data transmission rates, it has been considered to implement 5G communication systems in higher frequency bands (for example, 25-60 GHz bands) in addition to frequency bands that have been used by 3G communication systems and long term evolution (LTE) communication systems such that faster data transmission speeds can be provided.

For example, in order to alleviate path loss of radio waves in mmWave bands and to increase the propagation distance of radio waves, there has been ongoing discussion on technologies regarding beamforming, massive MIMO, full dimensional MIMO (FD-MIMO), array antennas, analog beamforming, and large-scale antennas in 5G communication systems.

Schemes for implementing 5G communication, a standalone (SA) scheme and a non-standalone (NSA) scheme are considered. According to the SA scheme, only a new radio (NR) system may be used, and according to the NSA scheme, the NR system may be used together with an existing LTE system. In the NSA scheme, a UE may use not only the eNB of the LTE system, but also the gNB of the NR system. A technology that enables the UE to use two types of communication systems may be referred to as dual connectivity.

SUMMARY

In order to transmit a signal from an electronic device to a communication network (for example, a base station), data generated by a processor or a communication processor may undergo signal processing through a radio frequency integrated circuit (RFIC) and a radio frequency front end (RFFE) circuit (hereinafter, simply referred to as "RFFE" for convenience of description) inside the electronic device, and may be then transmitted to the outside of the electronic device through an antenna.

The electronic device may transmit a reference signal (for example, a sounding reference signal (SRS)) which is referred to for channel estimation by a base station of the communication network to at least one antenna through the RFFE. The base station may estimate a channel by way of the reference signal transmitted from the electronic device, thereby efficiently allocating a downlink bandwidth, and may conduct multi-antenna signal processing or beamforming processing. The electronic device may receive a signal that has undergone the multi-antenna signal processing or beamforming processing from the base station, thereby improving the data receiving performance.

For example, when the electronic device operates in a time division duplex (TDD) mode with an LTE communication network, when the electronic device transmits the reference signal (for example, SRS) to an NR communication network, and if an antenna configured to receive data corresponding to the LTE communication network is disposed adjacent to or identical to an antenna configured to transmit the reference signal, the reference signal transmitted to the NR communication network may be received together with the data corresponding to the LTE communication network, thereby acting as an interference signal with the data corresponding to the LTE communication network.

Various example embodiments may provide an electronic device and/or a method for transmitting a reference signal by the electronic device, wherein when an NR antenna adjacent to an LTE antenna transmits a reference signal, the reference signal is controlled to be transmitted at an uplink data transmission timepoint of an LTE communication network according to a TDD configuration of an LTE communication network.

Various example embodiments may provide an electronic device and/or a method for transmitting a reference signal by the electronic device, wherein when a reference signal is transmitted to an NR communication network through an LTE antenna, the reference signal is controlled to be transmitted at an uplink data transmission timepoint of an LTE communication network according to a TDD configuration of an LTE communication network.

Various example embodiments may provide an electronic device and/or a method for transmitting a reference signal by the electronic device, wherein if a timepoint at which a reference signal is transmitted to an NR communication network corresponds to a timepoint at which uplink data is transmitted to an LTE communication network, the reference signal is controlled to be transmitted through an NR antenna adjacent to an LTE receiving antenna.

According to various example embodiments, an electronic device may include a communication processor, at least one radio frequency integrated circuit (RFIC) connected, directly or indirectly, to the communication processor, a first antenna group including a plurality of antennas connected, directly or indirectly, to the at least one RFIC to transmit or receive data of a first communication network, and a second antenna group including a plurality of antennas connected, directly or indirectly, to the at least one RFIC to transmit and/or receive data of a second communication network, wherein the communication processor may be configured to receive, from a first base station corresponding to the first communication network or a second base station corresponding to the second communication network, first information about a transmission timepoint of a reference signal transmitted to the first base station, receive, from the second base station, second information about a timepoint at which data of the second communication network is transmitted and/or received, and select, at and/or proximate a timepoint at which uplink data is transmitted to the second base station through a second antenna of the second antenna group, a first antenna adjacent to the second antenna, among the plurality of antennas of the first antenna group, and control to transmit the reference signal to the first base station, based on the received first information and the received second information.

According to various example embodiments, an electronic device may include a communication processor, at least one radio frequency integrated circuit (RFIC) connected, directly or indirectly, to the communication processor, and a plurality of antennas connected, directly or indirectly, to the at least one RFIC to transmit and/or receive data corresponding to at least one of a first communication network or a second communication network, wherein the communication processor may be configured to receive, from a first base station corresponding to the first communication network or a second base station corresponding to the second communication network, first information about a transmission timepoint of a reference signal transmitted to the first base station, receive, from the second base station, second information about a timepoint at which data of the second communication network is transmitted and/or received, identify a timepoint at which the reference signal is to be transmitted through an antenna configured to transmit a signal corresponding to the second communication network, among the plurality of antennas configured to transmit the reference signal, based on the received first information and the received second information, configure a timepoint at which a reference signal is to be transmitted through the antenna to correspond to a timepoint at which uplink data corresponding to the second communication network is transmitted, and control to transmit the reference signal to the first base station through the antenna, based on the configured timepoint at which the reference signal is transmitted.

According to various example embodiments, a method for operating an electronic device may comprise a method for transmitting a reference signal by an electronic device including a communication processor, at least one radio frequency integrated circuit (RFIC) connected, directly or indirectly, to the communication processor, a first antenna group including a plurality of antennas connected, directly or indirectly, to the at least one RFIC to transmit or receive data of a first communication network, and a second antenna group including a plurality of antennas connected, directly or indirectly, to the at least one RFIC to transmit or receive data of a second communication network, wherein the method may include receiving, from a first base station corresponding to the first communication network or a second base station corresponding to the second communication network, first information about a transmission timepoint of a reference signal transmitted to the first base station, receiving, from the second base station, second information about a timepoint at which data of the second communication network is transmitted and/or received, and selecting, at and/or proximate a timepoint at which uplink data is transmitted to the second base station through a second antenna of the second antenna group, a first antenna adjacent to the second antenna, among the plurality of antennas of the first antenna group, and transmitting the reference signal to the first base station, based on the received first information and the received second information.

According to various example embodiments, a method for operating an electronic device may comprise a method for transmitting a reference signal by an electronic device including a communication processor, at least one radio frequency integrated circuit (RFIC) connected, directly or indirectly, to the communication processor, and a plurality of antennas connected, directly or indirectly, to the at least one RFIC to transmit or receive data corresponding to at least one of a first communication network or a second communication network, wherein the method may include receiving, from a first base station corresponding to the first communication network or a second base station corresponding to the second communication network, first information about a transmission timepoint of a reference signal transmitted to the first base station, receiving, from the second base station, second information regarding a timepoint at which data of the second communication network is transmitted and/or received, identifying a timepoint at which the reference signal is to be transmitted through an antenna configured to transmit a signal corresponding to the second communication network, among the plurality of antennas through which the reference signal is to be transmitted, based on the received first information and the received second information, configuring a timepoint at which a reference signal is to be transmitted through the antenna to correspond to a timepoint at which uplink data corresponding to the second communication network is transmitted, and transmitting the reference signal to the first base station through the antenna, based on the configured timepoint at which the reference signal is transmitted.

According to various example embodiments, when an NR antenna adjacent to an LTE antenna transmits a reference signal, the reference signal may be controlled to be transmitted at an uplink data transmission timepoint of an LTE communication network according to a TDD configuration of an LTE communication network, thereby reducing interference caused by the reference signal with regard to data transmitted and/or received with the LTE communication network.

According to various example embodiments, when a reference signal is transmitted to an NR communication network through an LTE antenna, the reference signal may be controlled to be transmitted at an uplink data transmission timepoint of an LTE communication network according to a TDD configuration of an LTE communication network, thereby reducing interference caused by the reference signal with regard to data transmitted and/or received with the LTE communication network.

According to various example embodiments, if a timepoint at which a reference signal is transmitted to an NR communication network corresponds to a timepoint at which uplink data is transmitted to an LTE communication network, the reference signal may be controlled to be transmitted through an NR antenna adjacent to an LTE receiving antenna, thereby reducing interference caused by the reference signal with regard to data transmitted and/or received with the LTE communication network.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

FIG. 11 illustrates a relation between a TDD configuration of an electronic device and an SRS transmission timepoint according to an embodiment.

FIG. 13 illustrates a relation between a TDD configuration of an electronic device and an SRS transmission timepoint according to an embodiment.

DETAILED DESCRIPTION

Figure 1:
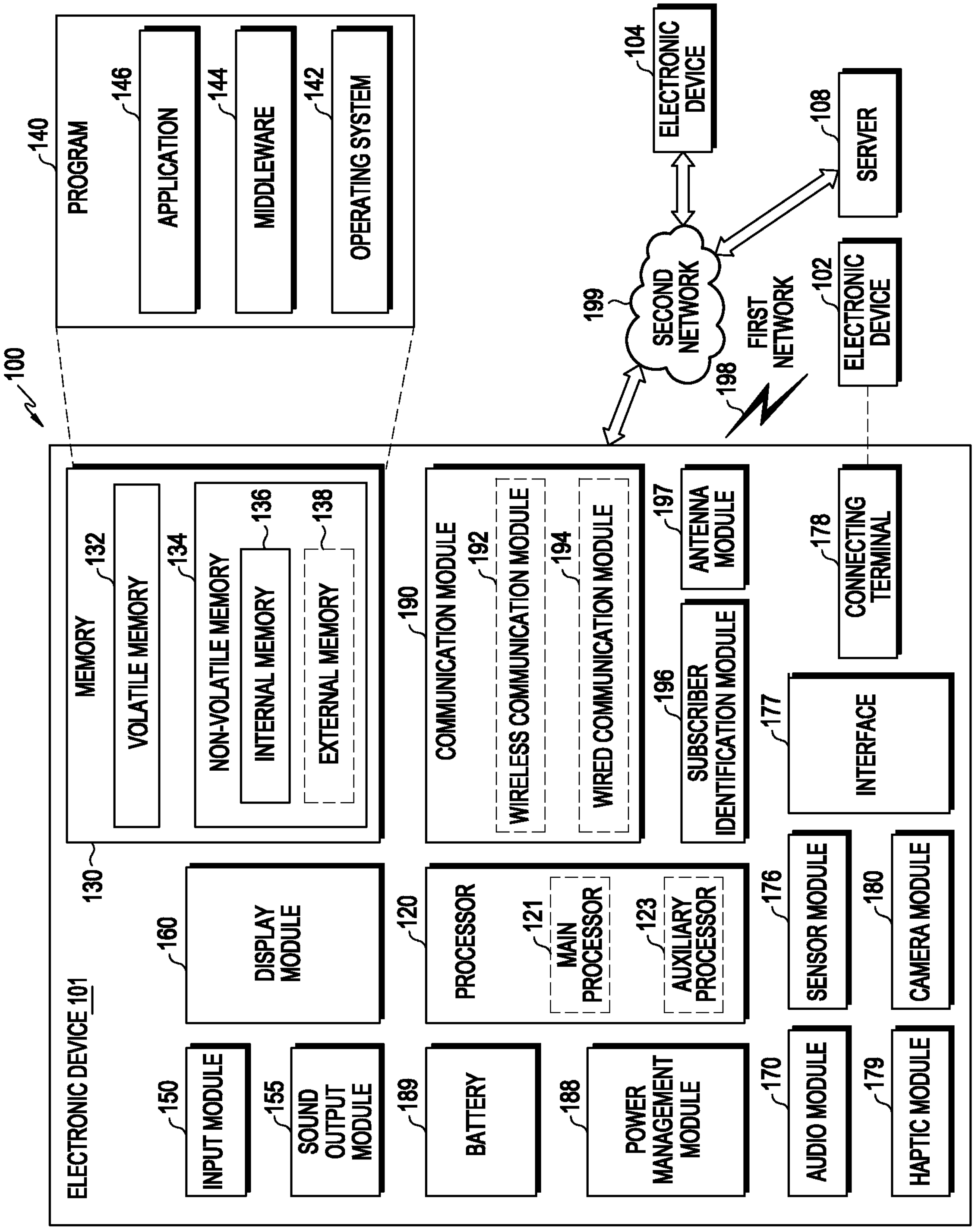
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (e.g., internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
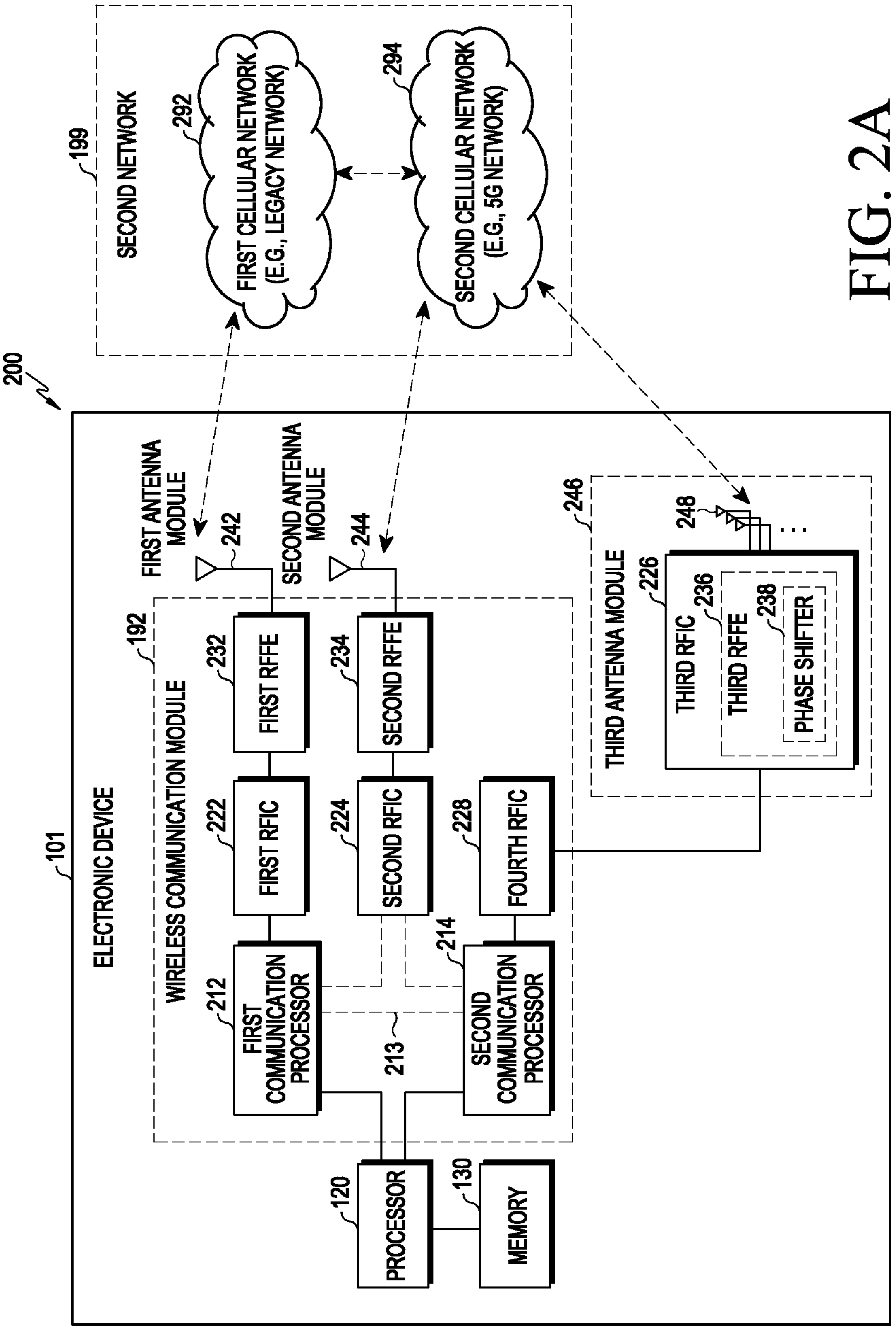
FIG. 2A is a block diagram of an electronic device for supporting legacy network communication and 5G network communication according to an embodiment.

FIG. 2A is a block diagram 200 of an electronic device 101 for supporting legacy network communication and 5G network communication according to an embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242 comprising an antenna, a second antenna module 244 comprising an antenna, a third antenna module 246 comprising an antenna, and antennas 248. The electronic device 101 may further include a processor 120 and a memory 130. The second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192 comprising communication circuitry. According to an embodiment, the fourth RFIC 228 may be omitted or included as part of the third RFIC 226.

The first communication processor 212 may support establishment of a communication channel in a band to be used for wireless communication with the first cellular network 292, and legacy network communication through the established communication channel According to an embodiment, the first cellular network may be a legacy network including a 2nd generation (2G), 3G, 4G, or long term evolution (LTE) network. The second communication processor 214 may support establishment of a communication channel corresponding to a designated band (for example, about 6 GHz to about 60 GHz) among bands to be used for wireless communication with the second cellular network 294, and 5G network communication through the established communication channel. According to an embodiment, the second cellular network 294 may be a 5G network defined by 3GPP. Additionally, according to an embodiment, the first communication processor 212 or the second communication processor 214 may support establishment of a communication channel corresponding to another designated band (for example, about 6 GHz or less) among the bands to be used for wireless communication with the second cellular network 294, and 5G network communication through the established communication channel.

The first communication processor 212 may transmit/receive data with the second communication processor 214. For example, data that has been classified as being supposed to be transmitted through the second cellular network 294 may be changed to be transmitted through the first cellular network 292. In this case, the first communication processor 212 may receive transmission data from the second communication processor 214. For example, the first communication processor 212 may transmit/receive data with the second communication processor 214 through an inter-processor interface 213. The inter-processor interface 213 may be implemented, for example, as a universal asynchronous receiver/transmitter (UART) (for example, high speed-UART (HS-UART) or peripheral component interconnect bus express (PCIe) interface, but the type thereof is not limited. Alternatively, the first communication processor 212 and the second communication processor 214 may exchange control information and packet data information by using a shared memory, for example. The first communication processor 212 may transmit/receive various pieces of information, such as sensing information, information regarding output intensity, and resource block (RB) allocation information, with the second communication processor 214.

Depending on implementation, the first communication processor 212 need not be directly connected to the second communication processor 214. In this case, the first communication processor 212 may transmit/receive data with the second communication processor 214 through the processor 120 (for example, an application processor). For example, the first communication processor 212 and the second communication processor 214 may transmit/receive data with the processor 120 (for example, an application processor) through an HS-UART interface or a PCIe interface, but the type of the interface is not limited. Alternatively, the first communication processor 212 and the second communication processor 214 may exchange control information and packet data information with the processor 120 (for example, an application processor) by using a shared memory.

According to an embodiment, the first communication processor 212 and the second communication processor 214 may be implemented inside a single chip or a single package. According to an embodiment, the first communication processor 212 or the second communication processor 214 may be implemented inside a single chip or a single package with a processor 120, an auxiliary processor 123, or a communication module 190 comprising communication circuitry. For example, as in FIG. 2B, the integrated communication processor 260 may support all functions for communication with the first cellular network 292 and the second cellular network 294.

During transmission, the first RFIC 222 may convert a baseband signal generated by the first communication processor 212 into a radio frequency (RF) signal of about 700 MHz to about 3 GHz used in the first cellular network 292 (for example, a legacy network). During reception, an RF signal may be acquired from the first network 292 (for example, a legacy network and/or a cellular network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

During transmission, the second RFIC 224 may convert a baseband signal generated by the first communication processor 212 or the second communication processor 214 into an RF signal (hereinafter, referred to as a 5G Sub6 RF signal) in a Sub6 band (for example, about 6 GHz or less) used in the second cellular network 294 (for example, a 5G network). During reception, a 5G Sub6 RF signal may be acquired from the second cellular network 294 (for example, a 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be preprocessed by a corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, about 6 GHz to about 60 GHz) to be used in the second cellular network 294 (for example, a 5G network). During reception, a 5G Above6 RF signal may be acquired from the second cellular network 294 (for example, a 5G network) through an antenna (for example, the antenna 248) and may be preprocessed through the third RFFE 236. The third RFIC 226 may convert the preprocessed 5G Above6 RF signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from or as a part of the third RFIC 226. In such a case, the fourth RFIC 228 may convert a baseband signal generated by the second communication processor 214 into an RF signal (hereinafter, referred to as an IF signal) in an intermediate frequency band (for example, about 9 GHz to about 11 GHz) and may then transfer the IF signal to the third RFIC 226. The third RFIC 226 may convert the IF signal into a 5G Above6 RF signal. During reception, a 5G Above6 RF signal may be received from the second cellular network 294 (for example, a 5G network) through an antenna (for example, the antenna 248) and may be converted into an IF signal by the third RFIC 226. The fourth RFIC 228 may convert the IF signal into a baseband signal such that the second communication processor 214 can process the same.

According to an embodiment, the first RFIC 222 and the second RFIC 224 may be implemented as at least a part of a single chip or a single package. According to an embodiment, in FIG. 2A or FIG. 2B, the first RFIC 222 and the second RFIC 224, if implemented as a single chip or a single package, may be implemented as an integrated RFIC. In this case, the integrated RFIC may be connected, directly or indirectly, to the first RFFE 232 and the second RFFE 234, and the integrated RFIC may convert a baseband signal into a signal in a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least a part of a single chip or a single package. According to an embodiment, at least one of the first antenna module 242 or the second antenna module 244 may be omitted or coupled to another antenna module so as to process RF signals in corresponding multiple bands.

According to an embodiment, the third RFIC 226 and the antenna 248 may be disposed on an identical substrate so as to form a third antenna module 246. For example, the wireless communication module 192 comprising communication circuitry or the processor 120, comprising processing circuitry, may be disposed on a first substrate (for example, a main PCB). In such a case, the third RFIC 226 may be disposed on a partial area (for example, on the lower surface) of a second substrate (for example, a sub PCB) separate from the first substrate, and the antenna 248 may be disposed on another partial area (for example, on the upper surface), thereby forming a third antenna module 246. By disposing the third RFIC 226 and the antenna 248 on an identical substrate, the length of a transmission line therebetween can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of transmission with the second network 294 (for example, a 5G network).

According to an embodiment, the antenna 248 may be formed as an antenna array including multiple antenna elements which may be used for beamforming. In such a case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal to be transmitted to the outside (for example, a base station of a 5G network) of the electronic device 101 through a corresponding antenna element. During reception, each of the multiple phase shifters 238 may shift the phase of a 5G Above6 RF signal received from the outside through a corresponding antenna element to an identical or substantially identical phase. This enables transmission or reception through beamforming between the electronic device 101 and the outside.

The second cellular network 294 (for example, a 5G network) may operate independently (for example, standalone (SA)) of the first cellular network 292 (for example, a legacy network), or may operate while being connected thereto (for example, non-standalone (NSA)). For example, the 5G network may have only an access network (for example, a 5G radio access network (RAN) or a next-generation RAN (NG RAN)) and may have no core network (for example, a next-generation core (NGC)). In such a case, the electronic device 101 may access the access network of the 5G network and may then access an external network (for example, the Internet) under the control of a core network (for example, an evolved packed core (EPC)) of the legacy network. Protocol information (for example, LTE protocol information) for communication with the legacy network or protocol information (for example, new radio (NR) protocol information) for communication with the 5G network may be stored in the memory 130 and may be accessed by another component (for example, the processor 120, the first communication processor 212, or the second communication processor 214). Each processor comprises processing circuitry.

Figure 3A:
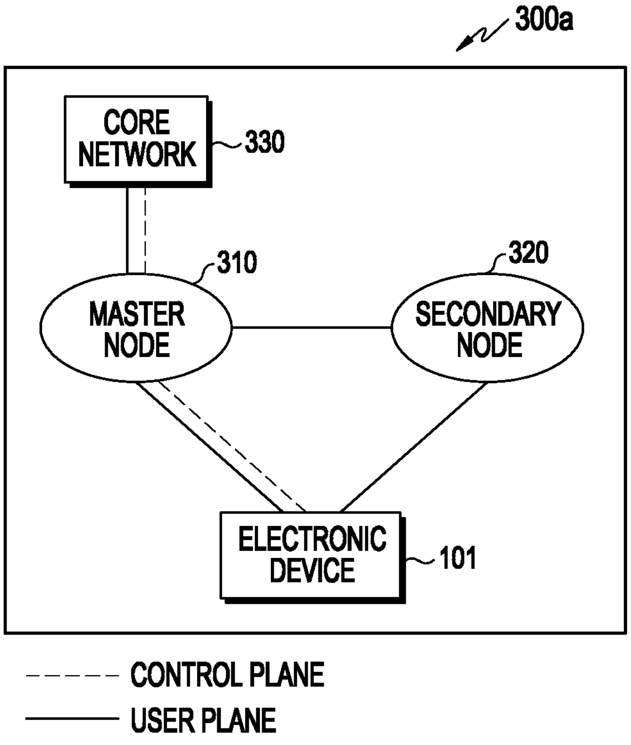
FIG. 3A illustrates wireless communication systems configured to provide a network of legacy communication and/or 5G communication according to an embodiment.
Figure 3B:
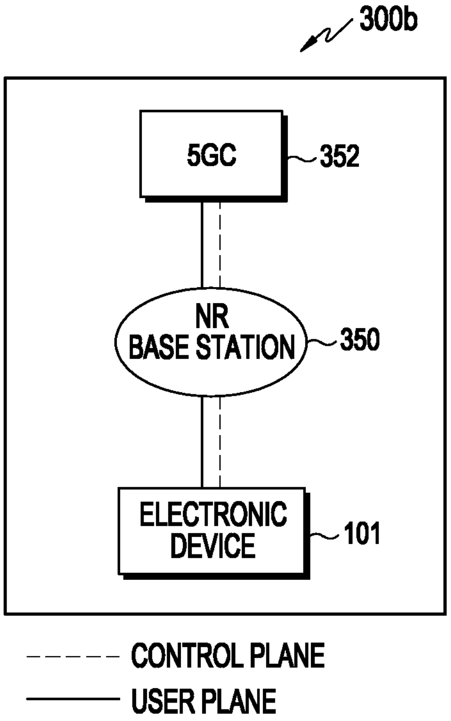
FIG. 3B illustrates wireless communication systems configured to provide a network of legacy communication and/or 5G communication according to an embodiment.
Figure 3C:
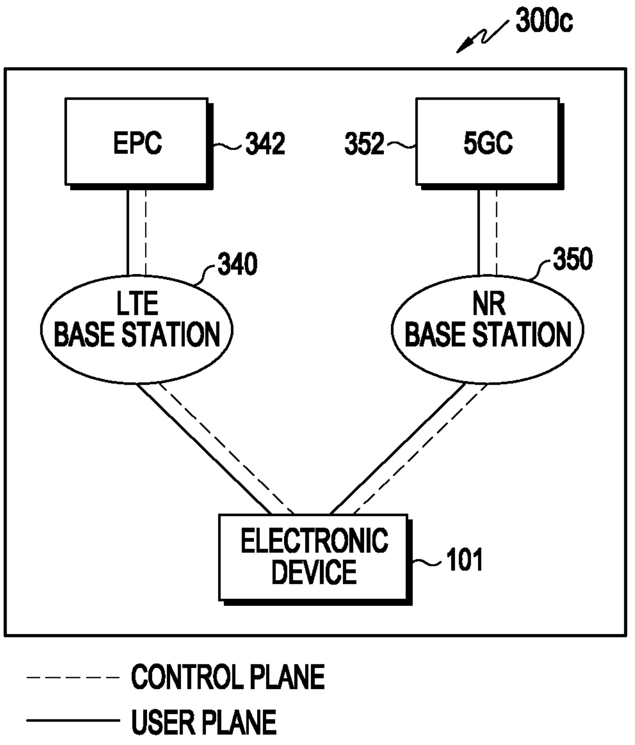
FIG. 3C illustrates wireless communication systems configured to provide a network of legacy communication and/or 5G communication according to an embodiment.

FIG. 3A, FIG. 3B, and FIG. 3C illustrate wireless communication systems configured to provide a network of legacy communication and/or 5G communication according to an embodiment. Referring to FIG. 3A, FIG. 3B, and FIG. 3C, the network environments 300*a* to 300*c* may include at least one of a legacy network and a 5G network. The legacy network may include, for example, a 4G or LTE base station 340 (for example, an eNodeB (eNB)) configured to support wireless connection to an electronic device 101 according to 3GPP standards, and an evolved packet core (EPC) 342 configured to manage 4G communication. The 5G network may include, for example, a new radio (NR) base station 350 (for example, a gNodeB (gNB)) configured to support wireless connection to the electronic device 101, and a 5th generation core (5GC) 352 configured to manage 5G communication of the electronic device 101.

According to various example embodiments, the electronic device 101 may transmit/receive a control message and user data through legacy communication and/or 5G communication. The control message may include, for example, a message related to at least one of security control, bearer setup, authentication, registration, or mobility management of the electronic device 101. The user data may refer to user data, for example, other than the control message transmitted/received between the electronic device 101 and the core network 330 (for example, the EPC 342).

Referring to FIG. 3A, FIG. 3B, and FIG. 3C, the electronic device 101 according to an embodiment may transmit/receive at least one of a control message or user data with at least a part (for example, the NR base station 350 or the 5GC 352) of the 5G network by using at least a part (for example, the LTE base station 340 or the EPC 342) of the legacy network.

According to an embodiment, the network environment 300*a* may include a network environment which provides wireless communication dual connectivity (DC) to the LTE base station 340 and the NR base station 350, and which transmits/receives a control message with the electronic device 101 through a core network 330 of one of the EPC 342 or the 5GC 352.

According to an embodiment, in a DC environment, one of the LTE base station 340 or the NR base station 350 may operate as a master node (MN) 310, and the other may operate as a secondary node (SN) 320. The MN 310 may be connected, directly or indirectly, to the core network 330 so as to transmit/receive a control message. The MN 310 and the SN 320 may be connected, directly or indirectly, through a network interface so as to transmit/receive a message related to radio resource (for example, communication channel) management with each other.

According to an embodiment, the MN 310 may be configured as an LTE base station 340, the SN 320 may be configured as an NR base station 350, and the core network 330 may be configured as an EPC 342. For example, a control message may be transmitted/received through the LTE base station 340 and the EPC 342, and user data may be transmitted/received through at least one of the LTE base station 340 or the NR base station 350.

According to an embodiment, the MN 310 may be configured as an NR base station 350, the SN 320 may be configured as an LTE base station 340, and the core network 330 may be configured as a 5GC 352. For example, a control message may be transmitted/received through the NR base station 350 and the 5GC 352, and user data may be transmitted/received through at least one of the LTE base station 340 or the NR base station 350.

Referring to FIG. 3B, according to an embodiment, the 5G network may include an NR base station 350 and a 5GC 352, and may independently transmit/receive a control message and user data with the electronic device 101.

Referring to FIG. 3C, each of the legacy network and the 5G network according to an embodiment may independently provide data transmission/reception. For example, the electronic device 101 and the EPC 342 may transmit/receive a control message and user data through the LTE base station 340. For example, the electronic device 101 and the 5GC 352 may transmit/receive a control message and user data through the NR base station 350.

According to an embodiment, the electronic device 101 may be registered in at least one of the EPC 342 or the 5GC 352 so as to transmit/receive a control message.

According to an embodiment, the EPC 342 or the 5GC 352 may interwork so as to manage communication of the electronic device 101. For example, movement information of the electronic device 101 may be transmitted/received through an interface between the EPC 342 and the 5GC 352.

As described above, dual connectivity through the LTE base station 340 and the NR base station 350 may also be referred to as E-UTRA new radio dual connectivity (EN-DC).

Figure 2B:
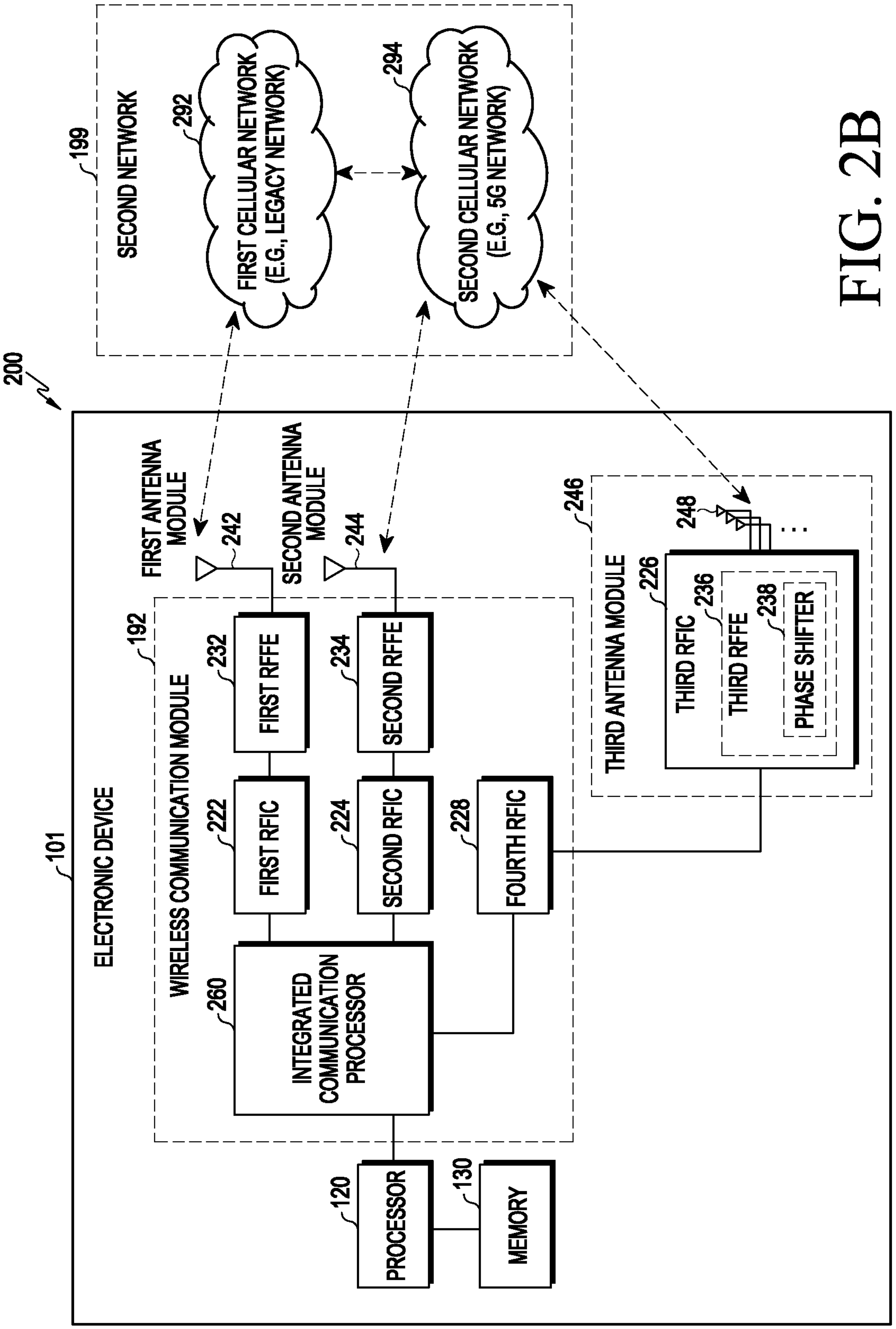
FIG. 2B is a block diagram of an electronic device for supporting legacy network communication and 5G network communication according to an embodiment.

Hereinafter, the structure of an electronic device 101 according to an embodiment will be described in detail with reference to FIG. 4. Although respective drawings of embodiments described below illustrate one communication processor 260 and one RFIC 410 connected, directly or indirectly, to at least one RFFE 431 and 432, various embodiments described below are not limited thereto. For example, in various embodiments described below, multiple communication processors 212 and 214 and/or multiple RFICs 222, 224, 226, and 228 may be connected to multiple RFFEs 431 and 432, respectively, as illustrated in FIG. 2A or FIG. 2B as well.

Figure 4:
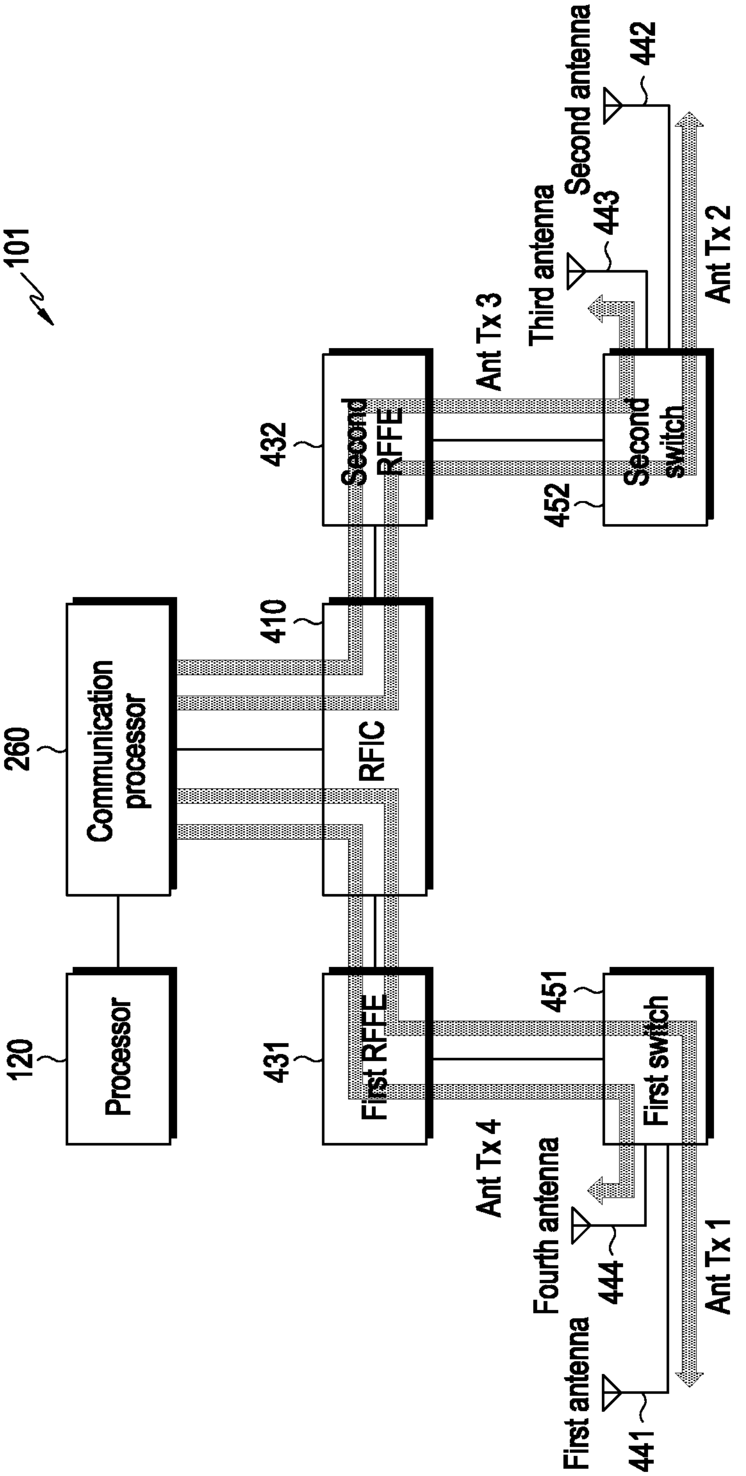
FIG. 4 is a block diagram of an electronic device according to an embodiment.

FIG. 4 is a block diagram of an electronic device according to an embodiment.

Referring to FIG. 4, the electronic device according to an embodiment (for example, the electronic device 101 in FIG. 1) may include a processor 120, a communication processor 260, an RFIC 410, a first RFFE 431, a second RFFE 432, a first antenna 441, a second antenna 442, a third antenna 443, a fourth antenna 444, a first switch 451, or a second switch 452. For example, the first RFFE 431 may be disposed on the upper portion inside the housing of the electronic device 101, and the second RFFE 432 may be disposed below the first RFFE 431 inside the housing of the electronic device 101, but various example embodiments are not limited by the disposition position.

According to an embodiment, during transmission, the RFIC 410 may convert a baseband signal generated by the communication processor 260 into an RF signal used in a first communication network or a second communication network. For example, the RFIC 410 may transmit an RF signal used in the first communication network to the first antenna 441 or the third antenna 443 through the first RFFE 431 and the first switch 451. The RFIC 410 may transmit an RF signal used in the first communication network or the second communication network to the second antenna 442 or the fourth antenna 444 through the second RFFE 432 and the second switch 452. According to an embodiment, the RFIC 410 may transmit an RF signal corresponding to the first communication network (for example, NR) to the first antenna 441 or the third antenna 443 through the first RFFE 431, and may transmit an RF signal corresponding to the second communication network (for example, LTE) to the second antenna 442 or the fourth antenna 444 through the second RFFE 432. According to an embodiment, the RFIC 410 may transmit an RF signal corresponding to the first communication network (for example, NR) or the second communication network (for example, LTE) to the first antenna 441 or the third antenna 443 through the first RFFE 431, and may transmit an RF signal corresponding to the first communication network (for example, NR) or the second communication network (for example, LTE), which is identical thereto, to the second antenna 442 or the fourth antenna 444 through the second RFFE 432, thereby operating as a multi-input multi-output (MIMO) antenna.

According to an embodiment, the path of transmission from the RFIC 410 to the first antenna 441 through the first RFFE 431 and the first switch 451 may be referred to as "a first antenna transmission path Ant Tx 1". The path of transmission from the RFIC 410 to the third antenna 443 through the first RFFE 431 and the first switch 451 may be referred to as "a third antenna transmission path Ant Tx 3".

According to an embodiment, during transmission, the RFIC 410 may convert a baseband signal generated by the communication processor 260 into an RF signal used in the first communication network or the second communication network. For example, the RFIC 410 may transmit an RF signal used in the first communication network or the second communication network to the second antenna 442 and/or the fourth antenna 444 such as through the second RFFE 432 and the second switch 452.

According to an embodiment, the path of transmission from the RFIC 410 to the second antenna 442 through the second RFFE 432 and the second switch 452 may be referred to as "a second antenna transmission path Ant Tx 2". The path of transmission from the RFIC 410 to the fourth antenna 444 through the second RFFE 432 and the second switch 452 may be referred to as "a fourth antenna transmission path Ant Tx 4".

According to an embodiment, during reception, an RF signal may be received from the first communication network through the first antenna 441 or the third antenna 443, and the received RF signal may be transmitted to the communication processor 260 via at least one RFIC. In addition, an RF signal may be received from the first communication network or the second communication network through the second antenna 442 or the fourth antenna 444, and the received RF signal may be transmitted to the communication processor 260 via at least one RFIC.

According to an embodiment, the first communication network and the second communication network may be identical to or different from each other. For example, the first communication network may be a 5G network, and the second communication network may be a legacy network (for example, an LTE network). When the first communication network is an 5G network, the first RFFE 431 may be designed to be appropriate for processing a signal corresponding to the 5G network, and the second RFFE 432 may be designed to be appropriate for processing a signal corresponding to the legacy network.

According to an embodiment, the frequency band of signals transmitted through the first RFFE 431 and the frequency band of signals transmitted through the second RFFE 432 may be identical, similar, or different. For example, the frequency band of signals transmitted through the first RFFE 431 may be an N41 band (2.6 GHz) which is the frequency band of a 5G network, and the frequency band of signals transmitted through the second RFFE 432 may be a B41 band (2.6 GHz) which is the frequency band of an LTE network. In such a case, the first RFFE 431 and the second RFFE 432 may process signals in an identical or similar frequency band, but the first RFFE 431 may be designed to be capable of signal processing conforming to the characteristics of a 5G network, and the second RFFE 432 may be designed to be capable of signal processing conforming to the characteristics of an LTE network.

According to an embodiment, the electronic device may transmit signals through the first RFFE 431 and the first switch 451 and through one of the first antenna 441 and the third antenna 443, and may simultaneously receive signals through the first antenna 441 and the third antenna 443. In order to estimate a channel between the electronic device and a base station with regard to signals received through the first antenna 441 and the third antenna 443, a reference signal (for example, a sounding reference signal (SRS)) may be transmitted through the first antenna 441 and the third antenna 443. When one of the first antenna 441 and the third antenna 443 is used as a transmitting antenna (Tx), and when the first antenna 441 and the third antenna 443 are both used as receiving antennas (Rx), this configuration may be referred to as “1T2R”. According to an embodiment, the electronic device may receive signals through multiple receiving antennas, thereby providing the function of a receiving diversity antenna or a MIMO antenna.

According to an embodiment, when the electronic device transmits signals through the second RFFE 432 and the second switch 452 and through one of the second antenna 442 and the fourth antenna 444 and transmits a reference signal through the second antenna 442 and the fourth antenna 444, this configuration may be referred to as “1T2R” because one transmitting antenna (Tx) and two receiving antennas (Rx) are used.

According to an embodiment, when the electronic device simultaneously transmits/receives data through the first RFFE 431 and the second RFFE 432, this configuration may be referred to as “2T4R” because two transmitting antennas (Tx) and four receiving antennas (Rx) are used. The electronic device illustrated in FIG. 4 may operate according to 1T2R or 2T4R according to an embodiment, and may thus be referred to as an electronic device supporting “1T2R/2T4R”.

According to an embodiment, the communication processor 260 may control a reference signal (for example, a sounding reference signal (SRS)), which is referred to for channel estimation by a base station of a first communication network, to be transmitted to at least one antenna (first antenna 441 or third antenna 443) among multiple antennas of the first antenna group through the first RFFE circuit 431. According to an embodiment, the communication processor 260 may control the reference signal, which is referred to for channel estimation by the base station of the first communication network, to be additionally transmitted to at least one antenna (second antenna 442 or fourth antenna 444) among multiple antennas of the second antenna group through the second RFFE circuit 432. If the electronic device transmits a reference signal through the first antenna 441, the second antenna 442, the third antenna 443, and the fourth antenna 444, the base station of the first communication network may receive the reference signal and conduct channel estimation through the received reference signal. The base station of the first communication network may transmit a signal beamformed with regard to the first antenna 441, the second antenna 442, the third antenna 443, and the fourth antenna 444. The electronic device may receive a signal transmitted from the base station of the first communication network through the first antenna 441, the second antenna 442, the third antenna 443, and the fourth antenna 444. Although the electronic device illustrated in FIG. 4 is designed to support “1T2R/2T4R”, a reference signal may be transmitted to the base station of the first communication network through the first antenna 441, the second antenna 442, the third antenna 443, and the fourth antenna 444 such that the electronic device operates according to “1T4R”.

According to an embodiment, although it has been described with reference to FIG. 4 that one RFIC 410 is connected, directly or indirectly, to two RFFEs 431 and 432 so as to transmit a reference signal (for example, SRS), the above-described embodiments are also applicable to various types of structures in which at least one RFIC is connected, directly or indirectly, to three or more RFFEs, and each RFFE is connected, directly or indirectly, to at least one antenna.

Figure 5A:
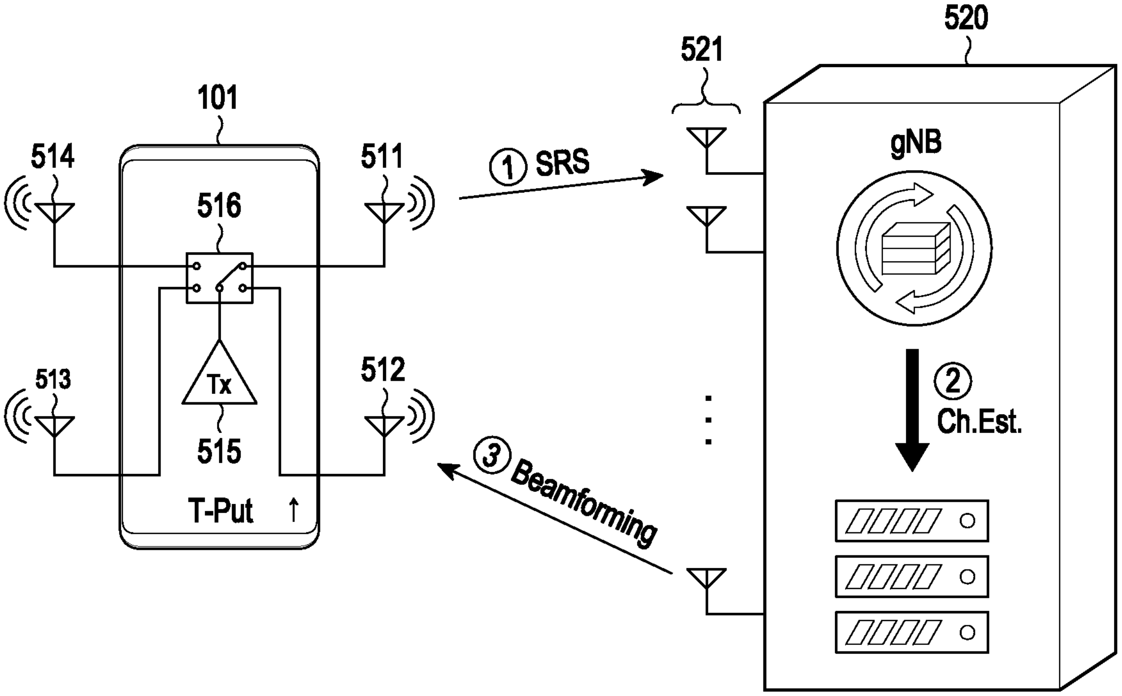
FIG. 5A illustrates a reference signal transmitted by an electronic device according to an embodiment.
Figure 5B:
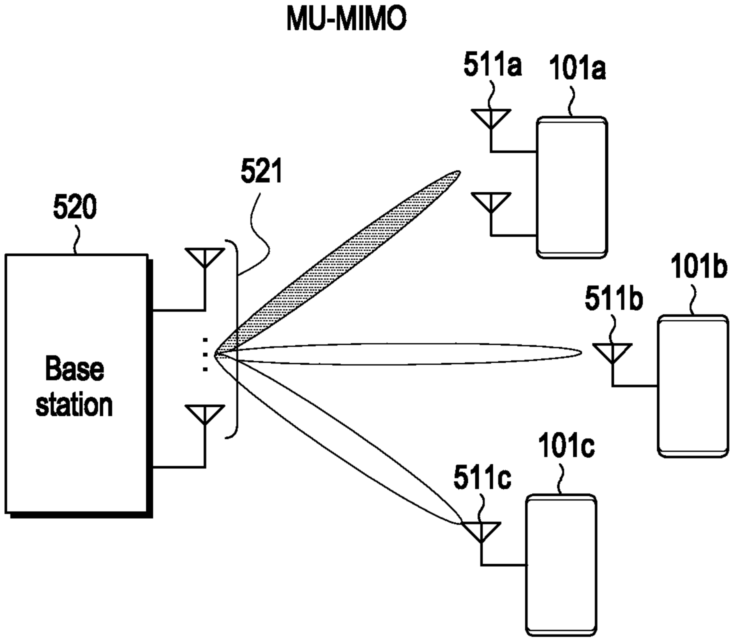
FIG. 5B illustrates a reference signal transmitted by an electronic device according to an embodiment.
Figure 5C:
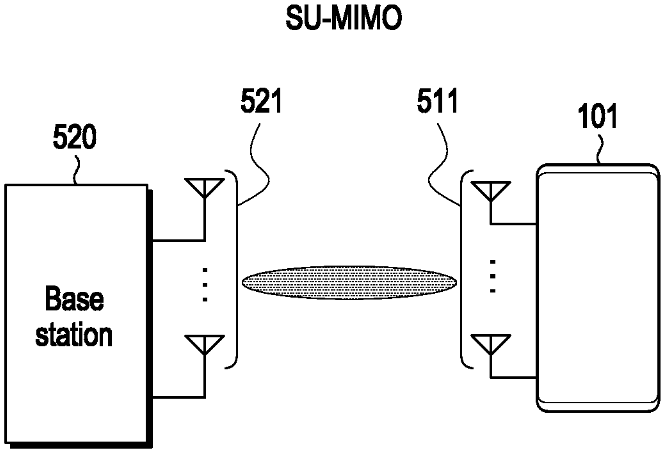
FIG. 5C illustrates a reference signal transmitted by an electronic device according to an embodiment.

FIG. 5A, FIG. 5B, and FIG. 5C illustrate a reference signal transmitted by an electronic device according to an embodiment. Referring to FIG. 5A, the electronic device 101 (for example, the electronic device 101 in FIG. 1) may transmit a reference signal (for example, SRS) through four antennas (for example, a first antenna 511, a second antenna 512, a third antenna 513, and a fourth antenna 514). For example, the electronic device 101 may amplify a reference signal through at least one power amplifier (PA) 515, and may transmit the amplified reference signal to the first antenna 511, the second antenna 512, the third antenna 513, and the fourth antenna 514 through at least one switch 516. The reference signal (for example, SRS) transmitted through respective antennas (for example, the first antenna 511, the second antenna 512, the third antenna 513, and the fourth antenna 514) of the electronic device 101 may be received through respective antennas 521 of a base station 520 (for example, a gNB). According to an embodiment, the electronic device 101 may transmit a reference signal through multiple power amplifiers (for example, RFFEs) as described above with reference to FIG. 4. For example, the electronic device 101 may configure a signal transmitted to the first antenna 511 or the third antenna 513 so as to be processed through a first amplifier (for example, a first RFFE 431), and may configure a signal transmitted to the second antenna 512 or the fourth antenna 514 so as to be processed through a second amplifier (for example, a second RFFE 432).

According to an embodiment, the base station 520 may receive the reference signal transmitted from the electronic device 101, and may estimate channels (ch.est.) between respective antennas (for example, the first antenna 511, the second antenna 512, the third antenna 513, and the fourth antenna 514) of the electronic device 101 and the base station 520 from the received reference signal. Based on the channel estimation, the base station 520 may transmit a beamformed signal to respective antennas of the electronic device 101. According to an embodiment, the base station 520 may configure a modulation and coding scheme (MCS) level regarding an uplink signal of the electronic device 101, based on the channel estimation, and may transmit the configured MCS level configuration information, which is included in downlink control information (DCI) as SRS resource indicator (SRI) information, to the electronic device 101. The electronic device 101 may determine transmission power of a physical uplink shared channel (PUSCH), based on a parameter set for power control included in the SRI.

Although one power amplifier 515 and one switch 516 are illustrated in FIG. 5A as being connected, directly or indirectly, to multiple antennas (a first antenna 511, a second antenna 512, a third antenna 513, and a fourth antenna 514) for convenience of description, a person skilled in the art could easily understand that the disclosure is not limited thereto. For example, the electronic device 101 may include the components included in the electronic device 101 illustrated in FIG. 4.

In addition, although the first antenna 511, the second antenna 512, the third antenna 513, and the fourth antenna 514 are illustrated in FIG. 5A as being disposed outside the electronic device 101, this is for convenience of description, and a person skilled in the art could easily understand that the first antenna 511, the second antenna 512, the third antenna 513, and the fourth antenna 514 may be positioned inside a housing that constitutes the exterior of the electronic device 101 and/or on at least a part of the housing, and this is applicable to other drawings as well.

Referring to FIG. 5B and FIG. 5C, the base station 520 may transmit the beamformed signal through antenna array 521 including multiple (for example, 32 or 64) antennas. The signal transmitted by the base station 520 may be received through each antenna 511 of the electronic device 101. For example, a situation in which multiple beamformed signals transmitted by a single base station 500 are received by respective antennas 511*a*, 511*b*, and 511*c* of multiple electronic devices 101*a*, 101*b*, and 101*c*, as illustrated in FIG. 5B, may be referred to as multi-user MIMO (MU-MIMO), and a situation in which a beamformed signal transmitted by a base station 520 is received by multiple antennas 511 of a single electronic device 101, as illustrated in FIG. 5C, may be referred to as single-user MIMO (SU-MIMO).

As illustrated in FIG. 5A, if the electronic device 101 transmits a reference signal (for example, SRS) through multiple transmission paths, the base station 520 may identify the channel environment with respective antennas (for example, the first antenna 511, the second antenna 512, the third antenna 513, and the fourth antenna 514) of the electronic device 101 and may then conduct beamforming, thereby improving the reference signal received power (RSRP) and/or the signal to noise ratio (SNR) of the downlink channel. If the RSRP and/or SNR of the downlink channel are improved, the rank index (RI) or channel quality indicator (CQI) regarding the corresponding electronic device may be improved. The base station 520 may allocate a high rank or modulation and code schemes (MCS) to the corresponding electronic device 101, based on the improved performance of the corresponding electronic device 101, thereby improving the downlink throughput of the electronic device 101.

According to an embodiment, the base station 520 may use a downlink reference signal for the sake of downlink channel estimation. For example, if the base station 520 transmits the downlink reference signal to the electronic device 101, the electronic device 101 may receive the downlink reference signal transmitted by the base station 520, thereby conducting channel estimation. The electronic device 101 may transmit the result of channel estimation to the base station 520, and the base station 520 may perform downlink beamforming with reference to the result of channel estimation transmitted by the electronic device 101. According to an embodiment, when the base station 520 conducts channel estimation by way of a reference signal (for example, SRS) transmitted by the electronic device 101, channel estimation may be conducted more quickly than channel estimation conducted by way of the downlink reference signal.

According to an embodiment, a first communication network (for example, a base station gNB) or a second communication network (for example, a base station eNB) may transmit a message (for example, a UE Capability Enquiry message) to the electronic device 101, thereby requesting various pieces of configuration information of the electronic device 101. For example, the first communication network (for example, a base station gNB) or the second communication network (for example, a base station eNB) may request information related to the receiving antenna of the electronic device 101 through the UE Capability Enquiry message. The electronic device 101 may receive the UE Capability Enquiry message from the first or second communication network and may transmit a UE Capability Information message to the first or second communication network in response thereto. According to an embodiment, the UE Capability Information message may include information related to the receiving antenna of the electronic device 101, such as "supportedSRS-TxPortSwitch t1r4" or "supportedSRS-TxPortSwitch t2r4" so as to correspond to the content of the UE Capability Enquiry message.

Based on the information related to the antenna being described such as "supportedSRS-TxPortSwitch t1r4" or ""supportedSRS-TxPortSwitch t2r4", the first communication network may confirm that the electronic device 101 can transmit signals by using four receiving antennas, and may transmit information regarding the timepoint at which a reference signal (for example, SRS) is to be transmitted with regard to each of the four antennas, the information being included in an RRC Reconfiguration message (or RRC connection Reconfiguration message).

Figure 6:
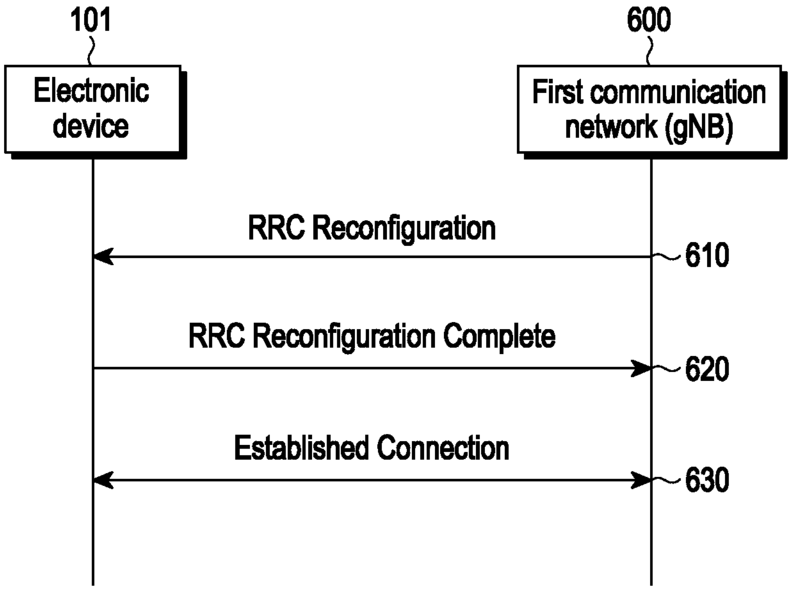
FIG. 6 is a flowchart illustrating a procedure in which signals are transmitted/received between an electronic device and a communication network according to an embodiment.

FIG. 6 is a flowchart illustrating a procedure in which signals are transmitted/received between an electronic device and a communication network according to an embodiment. Referring to FIG. 6, the electronic device 101 may configure RRC connection through a random access channel (RACH) procedure with a first communication network (for example, a base station gNB) 600.

According to an embodiment, in operation 610, the first communication network 600 may transmit an RRC Reconfiguration message to the electronic device 101. For example, the first communication network 600 may transmit an RRC Reconfiguration message in response to an RRC Request message transmitted by the electronic device 101. Referring to Table 1 below, the RRC Reconfiguration message may include information (for example, SRS-ResourceSet) related to SRS antenna switching.

TABLE 1

```
SRS-ResoourceSet
srs-ResourceSetId: 1
srs-ResourceIdList: 4 Items
  Item 0
    SRS-ResourceId: 1
  Item 1
    SRS-ResourceId: 2
  Item 2
    SRS-ResourceId: 3
  Item 3
    SRS-ResourceId: 4
```

TABLE 1-continued

| |
|---|
| resourceType: periodic (2) |
| periodic |
| usage: antennaSwitching (3) |
| alpha: alpha1 (7) |
| p0: −62dBm |
| pathlossReferenceRS: ssb-Index (0) |
| ssb-Index: 1 |

In addition, the RRC Reconfiguration message may include information regarding the timepoint at which a reference signal (for example, SRS) is to be transmitted with regard to each antenna in the electronic device 101, as in Table 2 below:

TABLE 2

| |
|---|
| perodicityAndOffset-p s120 : 17 |
| perodicityAndOffset-p s120 : 7 |
| perodicityAndOffset-p s120 : 13 |
| perodicityAndOffset-p s120 : 3 |
| nrofSymbols n1 |

Referring to the RRC Reconfiguration message, it is clear that the duration of SRS transmission may be determined by allocated symbols, as the description "nrofSymbols n1." indicates. In addition, referring to the RRC Reconfiguration message, the first SRS is configured to be transmitted once with regard to every 20 slots and to be transmitted in the 17th slot as the description "periodicityAndOffset-p s120: 17" indicates; the second SRS is configured to be transmitted once with regard to every 20 slots and to be transmitted in the 7th slot as the description "periodicityAndOffset-p s120: 7" indicates; the third SRS is configured to be transmitted once with regard to every 20 slots and to be transmitted in the 13th slot as the description "periodicityAndOffset-p s120: 13" indicates; and the fourth SRS is configured to be transmitted once with regard to every 20 slots and to be transmitted in the 3rd slot as the description "periodicityAndOffset-p s120: 3" indicates. According to an embodiment, the electronic device 101 may transmit four SRSs with regard to every 20 slots through respective antennas at different times according to the configuration of the RRC Reconfiguration. The size of one slot may be determined by subcarrier spacing (SCS). For example, when the SCS is 30 KHz, the time interval of one slot may be 0.5 ms, and the time interval of 20 slots may be 10 ms. Accordingly, the electronic device 101 may repeatedly transmit SRSs at different times through respective antennas at each period of 10 ms. According to an embodiment, one slot may include 14 symbols, and assuming that one symbol is allocated to transmit a single SRS, the symbol duration time (or symbol enable time) may be 0.5 ms*$\frac{1}{14}$=35 μs (0.035 ms).

According to an embodiment, in operation 620, the electronic device 101 may transmit an RRC Reconfiguration Complete message to the first communication network 600. As the RRC Reconfiguration procedure is normally completed, the electronic device 101 and the first communication network 600 complete the RRC connection configuration in operation 630.

Referring back to FIG. 4, according to an embodiment, the communication processor 260 and/or the RFIC 410 may transmit a reference signal at different times at each configured time period (for example, 10 ms) through respective antenna transmission paths (for example, the first antenna transmission path, the second antenna transmission path, the third antenna transmission path, and the fourth antenna transmission path), based on information regarding the reference signal (for example, SRS) transmission timepoint received from the first communication network 600 as described above.

Figure 7:
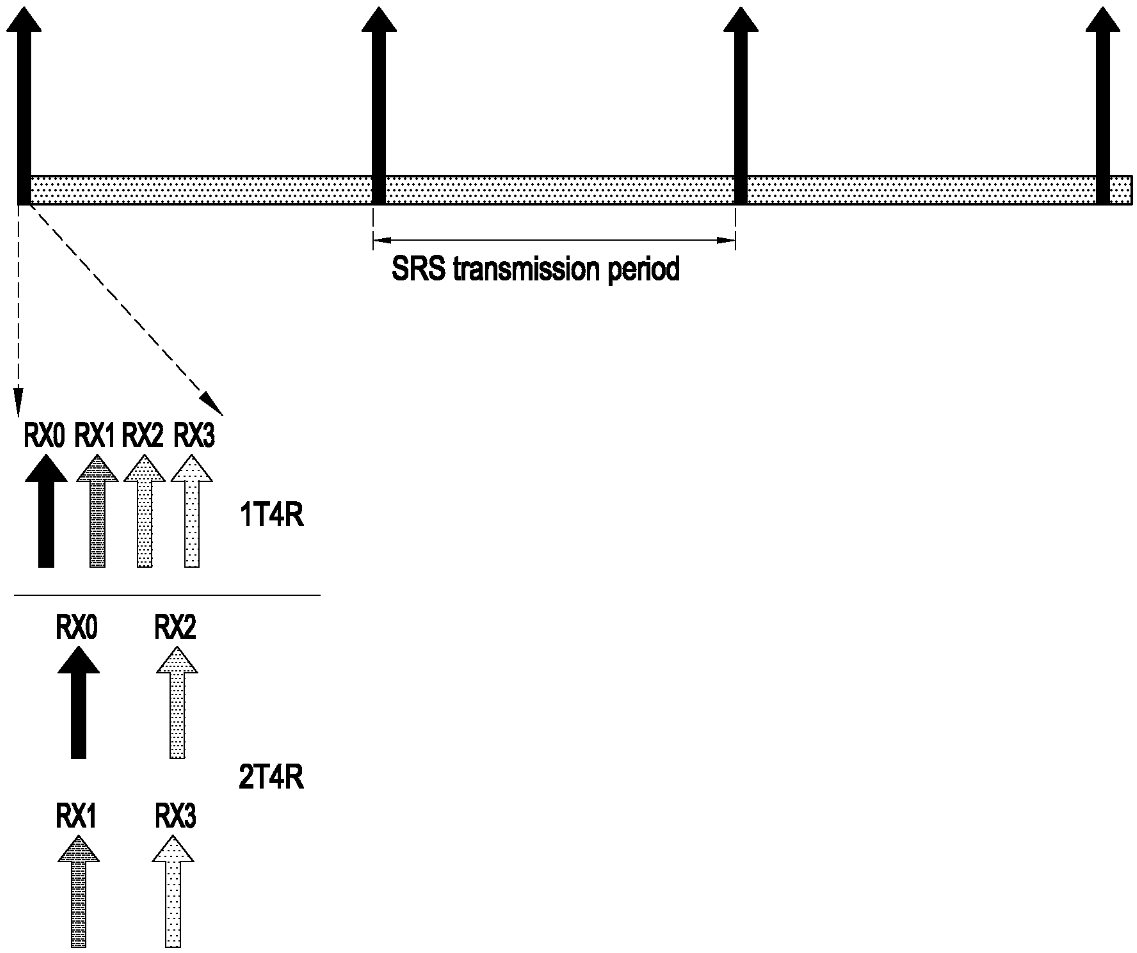
FIG. 7 illustrates a reference signal transmission period according to an embodiment.
Figure 8:
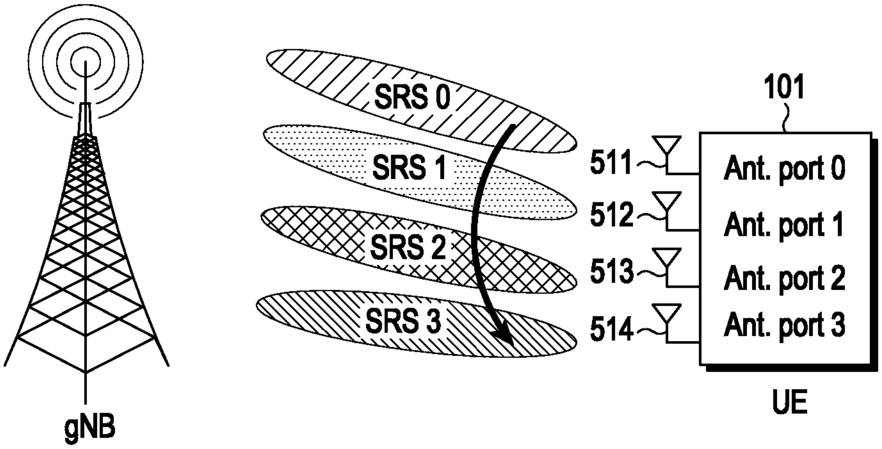
FIG. 8 illustrates the concept of reference signal transmission by an electronic device according to an embodiment.

FIG. 7 illustrates a reference signal transmission period according to an embodiment. FIG. 8 illustrates the concept of reference signal transmission by an electronic device according to an embodiment.

Referring to FIG. 7 and FIG. 8, a configured number (for example, four) of SRSs may be transmitted at each configured SRS transmission period (for example, 10 ms, 20 ms, 40 ms, or 80 ms), for example. As described above with reference to FIG. 6, in the case of "1T4R" configuration, the electronic device (for example, the electronic device 101 in FIG. 1) may transmit four SRSs at different times through respective antennas within a configured range (for example, 20 slots (10 ms)) at each SRS transmission period (for example, 10 ms, 20 ms, 40 ms, or 80 ms) according to the configuration of the RRC Reconfiguration. For example, the first SRS (SRS 0) may be transmitted through the first antenna 441 or 511 (RX0) (Ant.port0) in the 17th slot among the 20 slots; the second SRS (SRS 1) may be transmitted through the second antenna 442 or 512 (RX1) (Ant.port1) in the 7th slot; the third SRS (SRS 2) may be transmitted through the third antenna 443 or 513 (RX2) (Ant.port2) in the 13th slot; and the fourth SRS (SRS 3) may be transmitted through the fourth antenna 444 or 514 (RX3) (Ant.port3) in the 3rd slot.

According to an embodiment, in the case of "2T4R" configuration, the electronic device 101 may transmit four SRSs at different times through respective antennas within a configured range (for example, 20 slots (10 ms)) at each SRS transmission period (for example, 10 ms, 20 ms, 40 ms, or 80 ms) according to the configuration of the RRC Reconfiguration. For example, the electronic device 101 may transmit the first SRS (SRS 0) through the first antenna 441 or 511 (RX0) (Ant.port0) at a first timepoint, and may transmit the second SRS (SRS 1) through the second antenna 442 or 512 (RX1) (Ant.port1). The electronic device 101 may transmit the third SRS (SRS 2) through the third antenna 443 or 513 (RX2) (Ant.port2) at a second timepoint, and may transmit the fourth SRS (SRS 3) through the fourth antenna 444 or 514 (RX3) (Ant.port3).

According to an embodiment, the reference signal may be a sounding reference signal (SRS) used for multi-antenna signal processing (for example, multi-input multi-output (MIMO) or beamforming) through uplink channel state measurement, but is not limited thereto. For example, although the SRS is given as an example of the reference signal in the preceding or following description, any type of uplink reference signal (for example, uplink demodulation reference signal (DM-RS)) transmitted from the electronic device 101 to a base station may be included in the reference signal described later.

Figure 9:
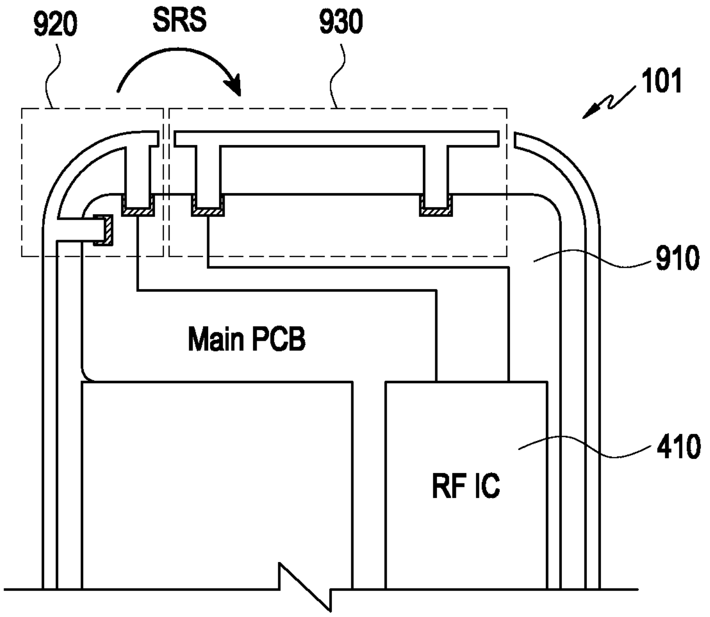
FIG. 9 illustrates interference by an SRS in an electronic device according to an embodiment.

FIG. 9 illustrates interference by an SRS in an electronic device according to an embodiment. Referring to FIG. 9, at least one LTE antenna (for example, a first LTE antenna 930) and/or at least one NR antenna (for example, a first NR antenna 920) may be disposed inside the housing that constitutes the exterior of the electronic device 101 and/or on at least a part of the housing.

In the following description, an LTE antenna may refer to an antenna used for data transmission/reception with an LTE communication network, but is not limited thereto. For example, the LTE antenna may be configured to transmit uplink data to an LTE base station and to receive downlink data from the LTE base station, but is not limited thereto. For example, the LTE antenna may be configured only to receive downlink data from the LTE base station. According to an embodiment, the LTE antenna may be configured to transmit or receive LTE data by default, but may also be configured to transmit or receive NR data as well.

Furthermore, in the following description, an NR antenna may refer to an antenna used for data transmission/reception with an NR communication network, but is not limited thereto. For example, the NR antenna may be configured to transmit uplink data to an NR base station and to receive downlink data from the NR base station, but is not limited thereto. For example, the NR antenna may be configured only to receive downlink data from the NR base station. According to an embodiment, the NR antenna may be configured to transmit or receive NR data by default, but may also be configured to transmit or receive LTE data as well.

According to an embodiment, as illustrated in FIG. 9, among multiple antennas disposed in the electronic device 101, the first NR antenna 920 and the first LTE antenna 930 may be disposed adjacent to each other. The first NR antenna 920 and the first LTE antenna 930 may be connected, directly or indirectly, to an identical RFIC 410 or to different RFICs through a main PCB 910. Although the first NR antenna 920 and the first LTE antenna 930 are illustrated in FIG. 9 as being connected to an identical RFIC 410 for convenience of description, the disclosure is not limited thereto.

According to an embodiment, the electronic device 101 may successively transmit an SRS through multiple NR antennas. For example, the electronic device 101 may transmit an SRS through a first NR antenna 920, and the SRS transmitted from the first NR antenna 920 may be input through an adjacent first LTE antenna 930. If the electronic device 101 is operating based on TDD with an LTE communication network as will be described later with reference to FIG. 10, and if the SRS transmission timepoint corresponds to the timepoint at which downlink data is received from the LTE communication network, the SRS transmitted through the first NR antenna 920 may act as an interference signal with regard to LTE downlink data received through the first LTE antenna 930. According to an embodiment, if the electronic device 101 is operating based on TDD with an LTE communication network as will be described later with reference to FIG. 10, and if the SRS transmission timepoint corresponds to the timepoint at which uplink data is transmitted to the LTE communication network, the SRS transmitted through the first NR antenna 920 may cause intermodulation (IM) in LTE uplink data transmitted through the adjacent first LTE antenna 930.

Figure 10:
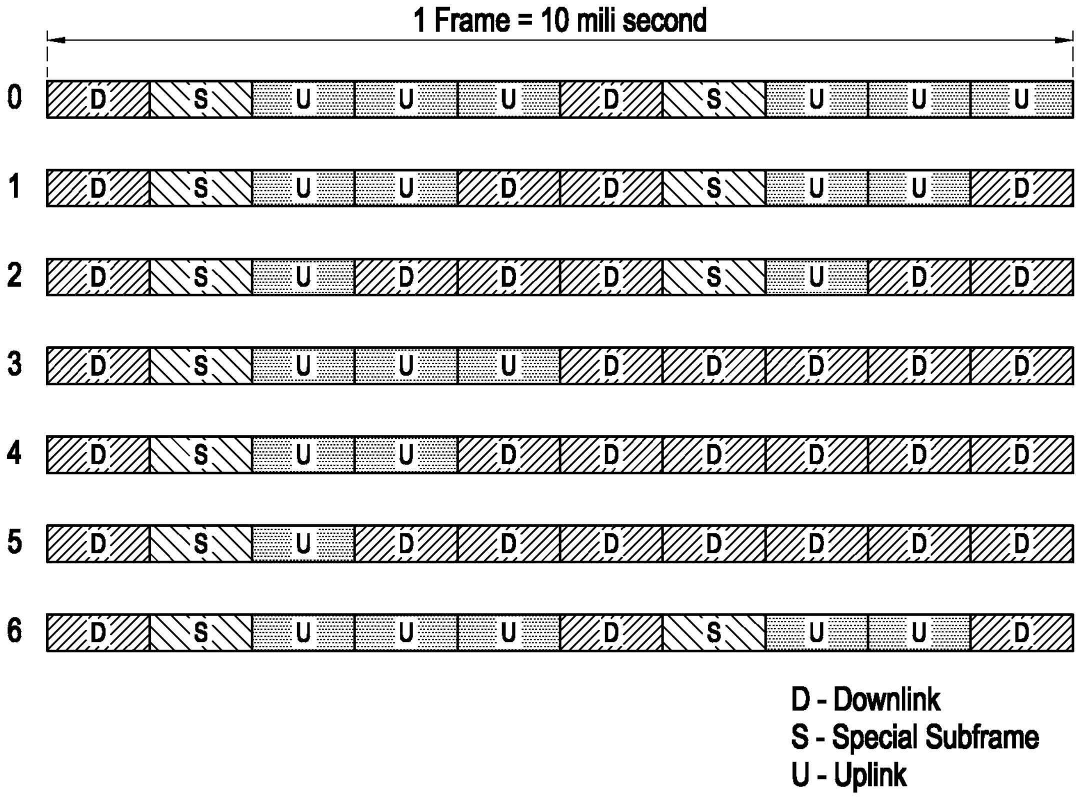
FIG. 10 illustrates a TDD configuration by according to an embodiment.

FIG. 10 illustrates a TDD configuration by according to an embodiment. Referring to FIG. 10, the electronic device 101 may operate in a TDD mode with an LTE communication network, and may receive configuration information related to the TDD mode from a base station corresponding to the LTE communication network. According to an embodiment, the configuration information related to the TDD mode may be transmitted through system information (for example, system information block (SIB) 1) broadcast from a base station, as in Table 3 below, according to 3GPP standard document TS 36.331.

TABLE 3

```
-- ASN1START
SystemInformationBlockType1-BR-r13 ::= SystemInformationBlockType1
SystemInformationBlockType1 ::=                SEQUENCE {
  cellAccessRelatedInfo                          SEQUENCE {
    plmn-IdentityList   PLMN-IdentityList,
    trackingAreaCodeTrackingAreaCode,
    cellIdentity   CellIdentity,
    cellBarred                          NUMERATED {barred, notBarred},
    intraFreqReselection                        ENUMERATED   {allowed,
notAllowed},
    csg-Indication                              BOOLEAN,
    csg-Identity   CSG-Identity   OPTIONAL   -- Need OR
  },
...
tdd-Config   TDD-Config                         OPTIONAL, -- Cond TDD
TDD-Config ::=                          SEQUENCE {
  subframeAssignment                            ENUMERATED {
                                        sa0, sa1, sa2, sa3, sa4, sa5, sa6},
  specialSubframePatterns               ENUMERATED {
                                        ssp0, ssp1, ssp2, ssp3, ssp4,ssp5, ssp6, ssp7,
                                        ssp8}
}
```

Referring to Table 3 above, according to the “subframeAssignment” configuration, the TDD frame structure may be configured in various formats (for example, a first format (sa0), a second format (sa1), a third format (sa2) . . . a seventh format (sa6)) as illustrated in FIG. 10. For example, when configured in the first format (sa0) by the SIB 1, the configured form may be “DSUUUDSUUU” as in frame no. 0 in FIG. 10. When configured in the second format (sa1) by the SIB 1, the configured form may be “DSUUDDSUUD” as in frame no. 1 in FIG. 10. When configured in the third format (sa2) by the SIB 1, the configured form may be “DSUUDDDSUDD” as in frame no. 2 in FIG. 10. When configured in the fourth format (sa3) by the SIB 1, the configured form may be “DSUUUDDDDD” as in frame no. 3 in FIG. 10. When configured in the fifth format (sa4) by the SIB 1, the configured form may be “DSUUDDDDDD” as in frame no. 4 in FIG. 10. When configured in the sixth format (sa5) by the SIB 1, the configured form may be “DSUDDDDDDD” as in frame no. 5 in FIG. 10. When configured in the seventh format (sa6) by the SIB 1, the configured form may be “DSUUUDSUUD” as in frame no. 6 in FIG. 10.

According to an embodiment, when the electronic device 101 has received the configuration information related to the TDD mode in the first format (sa0), the first subframe (subframe #0) and the sixth subframe (subframe #5) may operate as a downlink in each frame, the third subframe (subframe #2) to the fifth subframe (subframe #4) and the eighth subframe (subframe #7) to the tenth subframe (subframe #9) may operate as an uplink. In addition, the second subframe (subframe #1) and the seventh subframe (subframe #6), which correspond to timepoints of transition from a subframe configured as a downlink to a subframe configured as an uplink, may operate as a special subframe. The special subframe may include a downlink pilot timeslot (DwPTS), a guard period (GP), and an uplink pilot timeslot (UpPTS). According to an embodiment, when the serving cell of the LTE communication network and neighbor cells operate at an identical frequency, the configuration related to the TDD mode in FIG. 10 may be configured in the same format, but the disclosure is not limited thereto.

Figure 12:
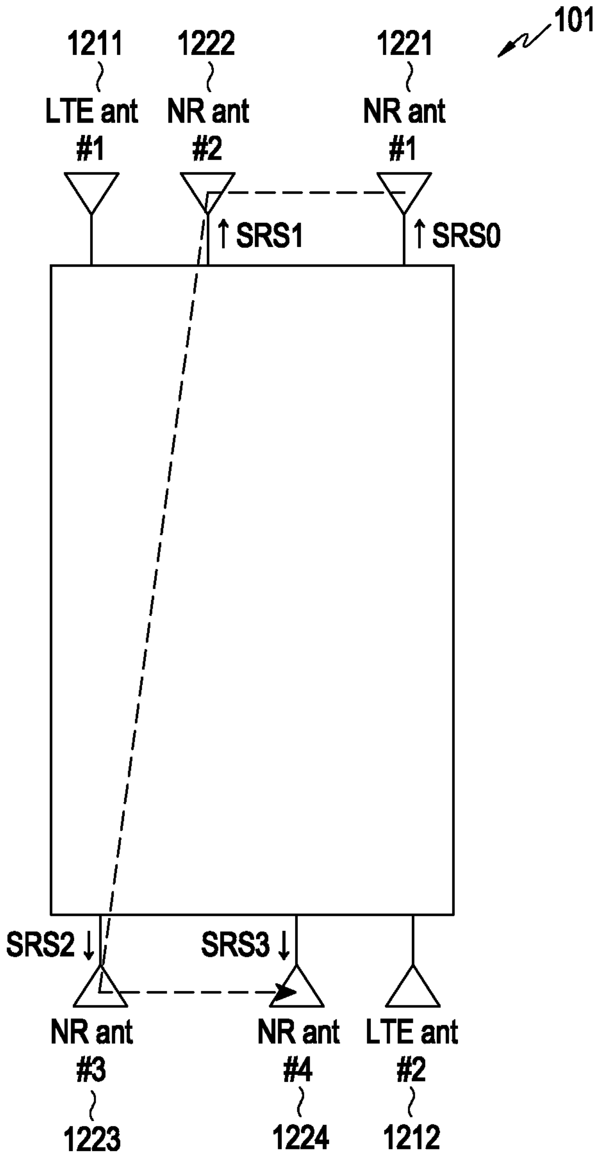
FIG. 12 illustrates an order in which SRSs are transmitted in an electronic device according to an embodiment.

FIG. 11 illustrates a relation between a TDD configuration of an electronic device and an SRS transmission timepoint according to an embodiment. FIG. 12 illustrates an order in which SRSs are transmitted in an electronic device according to an embodiment. Although multiple antennas are illustrated in FIG. 12 as being disposed outside the housing that constitutes the exterior of the electronic device 101, a person skilled in the art would easily understand that the multiple antennas may be positioned inside the housing of the electronic device 101 and/or on at least a part of the electronic device 101, and this is applicable to other drawings (for example, FIG. 14 and FIG. 15).

Referring to FIG. 11, when subcarrier spacing (SCS) of NR is configured to be 15 kHz, it may be assumed that one LTE subframe (for example, 1 ms) corresponds to one NR slot, but various embodiments described later are not limited thereto. For example, when SCS of NR is configured to be 30 kHz, it may be assumed that one LTE subframe (for example, 1 ms) corresponds to two NR slots. It will be assumed in the following description of embodiments that SCS of NR is configured to be 15 kHz, and embodiments described later may be applied identically or similarly even when SCS of NR is configured to be a different value.

Referring to FIG. 11 and FIG. 12 together, the electronic device 101 may transmit and/or receive data corresponding to an LTE communication network through a first LTE antenna 1211 or a second LTE antenna 1212. It will be assumed, for example, that the electronic device 101 operates in a TDD mode with regard to the LTE communication network as described above with reference to FIG. 10, and is configured in the sixth format (sa5). Then, among subframe no. 61 to subframe no. 80 in which SRSs are transmitted as illustrated in FIG. 11, subframe no. 61, subframe no. 64 to subframe no. 71, and subframe no. 74 to subframe no. 80 may be configured as downlink subframes, subframe no. 62 and subframe no. 72 may be configured as special subframes, and subframe no. 63 and subframe no. 73 may be configured as uplink subframes.

According to an embodiment, referring to FIG. 12, the electronic device 101 may transmit and/or receive data corresponding to an NR communication network through the first NR antenna 1221, the second NR antenna 1222, the third NR antenna 1223, or the fourth NR antenna 1224. For example, the electronic device 101 may receive information regarding an SRS transmission timepoint as described with reference to Table 1 and Table 2. Based on the received information, the electronic device 101 may transmit SRSs through multiple NR antennas (for example, first NR antenna 1221, the second NR antenna 1222, the third NR antenna 1223, and the fourth NR antenna 1224) in corresponding slots corresponding to subframes nos. 63, 68, 73, and 78. For example, as illustrated in FIG. 11 and FIG. 12, the electronic device 101 may transmit SRS 0 through the first NR antenna 1221 in slot no. 63, may transmit SRS 1 through the second NR antenna 1222 in slot no. 68, may transmit SRS 2 through the third NR antenna 1223 in slot no. 73, and may transmit SRS 3 through the fourth NR antenna 1224 in slot no. 78.

According to an embodiment, if SRS 1 transmitted in slot no. 68 is transmitted through the second NR antenna 1222 as illustrated in FIG. 12, the first LTE antenna 1211 disposed adjacent to the second NR antenna 1222 may receive a downlink signal transmitted from the LTE base station together with the SRS 1 because the subframe corresponding to slot no. 68 is configured as a downlink subframe according to the LTE TDD configuration. In this case, as illustrated in FIG. 9, SRS 1 may act as an interference signal with regard to the LTE downlink signal. Similarly, if SRS 3 transmitted in slot no. 78 is transmitted through the fourth NR antenna 1224, the second LTE antenna 1212 disposed adjacent to the fourth NR antenna 1224 may receive a downlink signal transmitted from the LTE base station together with the SRS 3 because of a downlink subframe configured according to the LTE TDD configuration. In this case, as illustrated in FIG. 9, SRS 1 may act as an interference signal with regard to the LTE downlink signal. In this case, as illustrated in FIG. 9, SRS 3 may act as an interference signal with regard to the LTE downlink signal. In various embodiments that follow, a method for reconfiguring the order of antennas through which the SRS is transmitted, thereby reducing the interference of the SRS exerted on the LTE downlink signal, or reducing intermodulation desensitization (IMD), will be described.

Figure 14:
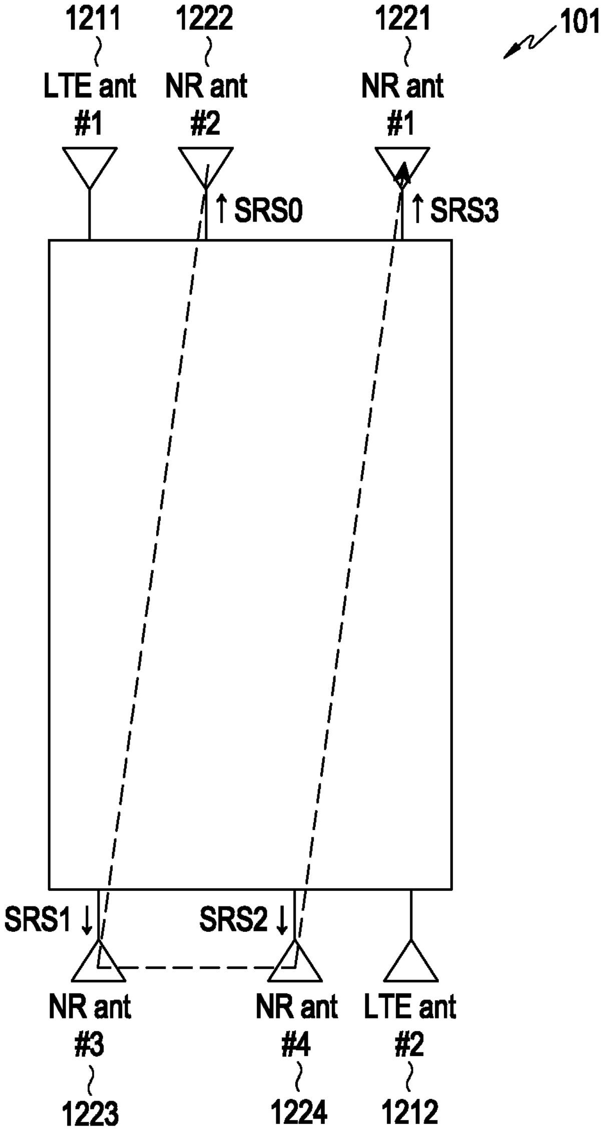
FIG. 14 illustrates an order in which SRSs are transmitted in an electronic device according to an embodiment.

FIG. 13 illustrates a relation between a TDD configuration of an electronic device and an SRS transmission timepoint according to an embodiment. FIG. 14 illustrates an order in which SRSs are transmitted in an electronic device according to an embodiment. Referring to FIG. 13, according to an embodiment, the electronic device 101 may transmit and/or receive data corresponding to an NR communication network through the first NR antenna 1221, the second NR antenna 1222, the third NR antenna 1223, or the fourth NR antenna 1224. For example, the electronic device 101 may transmit data to the NR base station through the first NR antenna 1221 and may receive data from the NR base station through the first NR antenna 1221, the second NR antenna 1222, the third NR antenna 1223, and the fourth NR antenna 1224, thereby operating according to "1T4R". According to an embodiment, the electronic device 101 may transmit data to the NR base station through the first NR antenna 1221 and the third NR antenna 1223 and may receive data from the NR base station through the first NR antenna 1221, the second NR antenna 1222, the third NR antenna 1223, and the fourth NR antenna 1224, thereby operating according to "2T4R".

According to an embodiment, the electronic device 101 may receive information regarding the SRS transmission timepoint as described above with reference to Table 1 and Table 2. Based on the received information, the electronic device 101 may transmit SRSs through multiple NR antennas (for example, first NR antenna 1221, the second NR antenna 1222, the third NR antenna 1223, and the fourth NR antenna 1224) in corresponding slots corresponding to subframes nos. 63, 68, 73, and 78. For example, as illustrated in FIG. 13 and FIG. 14, the electronic device 101 may transmit SRS 0 through the second NR antenna 1222 in slot no. 63, may transmit SRS 1 through the third NR antenna 1223 in slot no. 68, may transmit SRS 2 through the fourth NR antenna 1224 in slot no. 73, and may transmit SRS 3 through the first NR antenna 1221 in slot no. 78.

According to an embodiment, if SRS 1 transmitted in slot no. 68 is transmitted through the third NR antenna 1223, interference by the SRS may be reduced when LTE downlink data is received through the first LTE antenna 1211 or the second LTE antenna 1212 because the third NR antenna 1223 is disposed to be relatively spaced apart from the first LTE antenna 1211 and the second LTE antenna 1212. Similarly, if SRS 3 transmitted in slot no. 78 is transmitted through the first NR antenna 1221, interference by the SRS may be reduced when LTE downlink data is received through the first LTE antenna 1211 or the second LTE antenna 1212 because the first NR antenna 1221 is disposed to be relatively spaced apart from the first LTE antenna 1211 and the second LTE antenna 1212.

Although the SRS configuration has been described above so as to correspond to a periodic SRS, the same may be identically or similarly applied to semi-persistent SRS and aperiodic SRS transmissions according to an embodiment. For example, if periodic SRS transmission and aperiodic SRS are allocated to be transmitted in the same slot or symbol as the above-described method, the electronic device 101 may preferentially apply optimal antenna disposition for aperiodic SRS transmission, based on the above-described method.

Figure 15:
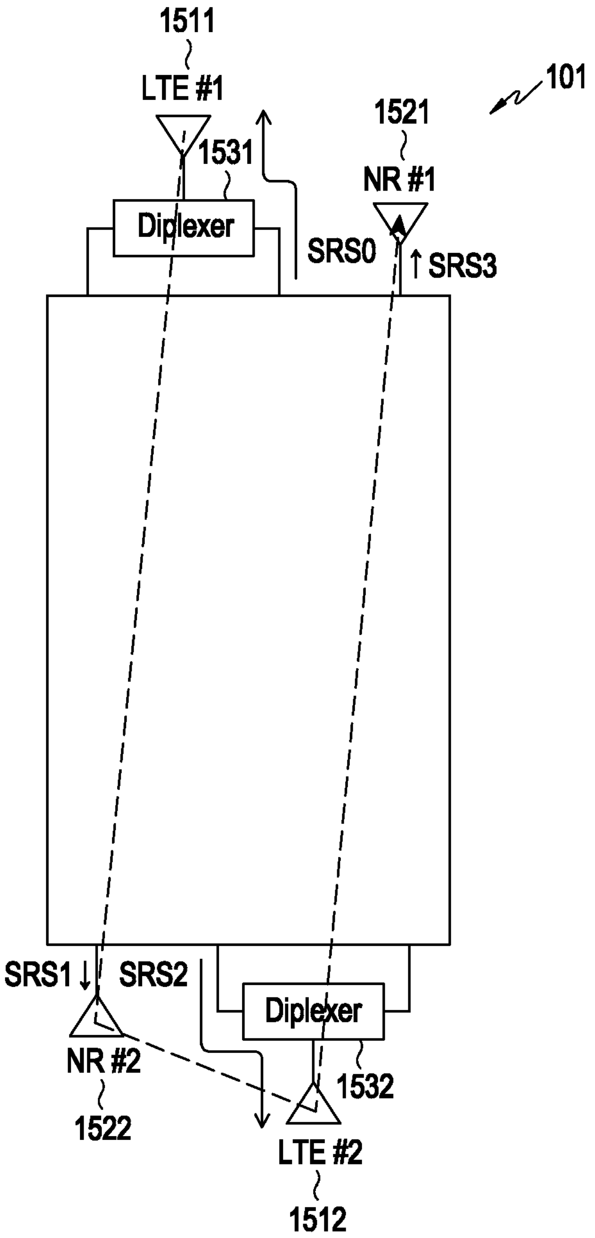
FIG. 15 illustrates an order in which SRSs are transmitted in an electronic device according to an embodiment.

FIG. 15 illustrates an order in which SRSs are transmitted in an electronic device according to an embodiment. Referring to FIG. 15, the electronic device 101 may include a first LTE antenna 1511, a second LTE antenna 1512, a first NR antenna 1521, and a second NR antenna 1522. According to an embodiment, the electronic device 101 may further include a first diplexer 1531 such that the first LTE antenna 1511 is used as an NR receiving antenna. In addition, the electronic device 101 may further include a second diplexer 1532 such that the second LTE antenna 1512 is used as an NR receiving antenna. For example, the electronic device 101 may transmit data to the NR base station through the first NR antenna 1521, and may receive data from the NR base station through the first NR antenna 1521, the second NR antenna 1522, the first LTE antenna 1511, and the second LTE antenna 1512, thereby operating according to "1T4R". According to an embodiment, the electronic device 101 may transmit data to the NR base station through the first NR antenna 1521 and the second NR antenna 1522, and may receive data from the NR base station through the first NR antenna 1521, the second NR antenna 1522, the first LTE antenna 1511, and the second LTE antenna 1512, thereby operating according to "2T4R".

According to an embodiment, the electronic device 101 may be configured to transmit SRS 0 through the first LTE antenna 1511 in slot no. 63, transmit SRS 1 through the second NR antenna 15221 in slot no. 68, transmit SRS 2 through the second LTE antenna 1512 in slot no. 73, and transmit SRS 3 through the first NR antenna 1521 in slot no. 78.

According to an embodiment, if SRS 1 transmitted in slot no. 68 is transmitted through the second NR antenna 1522, interference by the SRS may be reduced when LTE downlink data is received through the first LTE antenna 1511 or the second LTE antenna 1512 because the second NR antenna 1522 is disposed to be relatively spaced apart from the first LTE antenna 1511 and the second LTE antenna 1512. Similarly, if SRS 3 transmitted in slot no. 78 is transmitted through the first NR antenna 1521, interference by the SRS may be reduced when LTE downlink data is received through the first LTE antenna 1511 or the second LTE antenna 1512 because the first NR antenna 1521 is disposed to be relatively spaced apart from the first LTE antenna 1511 and the second LTE antenna 1512.

According to an embodiment, the mapping relation between SRSs and antennas described above with reference to FIG. 13, FIG. 14, an FIG. 15 may be managed in a table format in a memory inside the electronic device 101. According to an embodiment, allocation of the SRS transmission timepoint described above may be reconfigured if the LTE TDD configuration described above with reference to Table 3 is changed, and the mapping table stored in the memory may be updated in response to the reconfiguration.

According to an embodiment, it has been assumed in connection with the above-described embodiment that LTE and NR have identical timing sync, but if LTE and NR do not have identical timing sync, SRS transmissions and antennas may be mapped in view of overlapping between subframes of LTE and slots of NR. For example, if an NR radio frame is delayed from an LTE radio frame by about 1 ms, the mapping relation between antennas and SRSs may be configured with reference to a table in which the TDD configuration of LTE subframes is advanced by 1 ms. According to an embodiment, the timing sync between LTE and NR may be identified by measuring an SS/PBCH block received when the electronic device 101 connects to the LTE base station and the NR base station.

According to an embodiment, when the electronic device 101 transmits uplink data through an LTE antenna at an SRS transmission timepoint, the antenna to transmit the SRS may be configured such that the SRS is transmitted through an antenna spaced apart from the antenna (for example, the first LTE antenna 1211) for transmitting LTE uplink data, for example, through an antenna (for example, the fourth NR antenna 1224) adjacent to an antenna allocated for LTE reception diversity (for example, the second LTE antenna 1212), thereby reducing the occurrence of intermodulation desensitization (IMD).

It has been assumed in the above description of embodiments that four SRS transmission resources are configured, respectively, for a UE that supports 1T4R in terms of UE capability. According to an embodiment, the above-described embodiment may be identically or similarly applied to 2T4R in addition to the 1T4R. For example, the electronic device 101 may be configured to simultaneously transmit two SRS resources (two antennas) among four SRS resources (four antennas). In this case as well, the electronic device 101 may be configured to identify a range configured for LTE downlink data reception, and to transmit two SRSs, which are transmitted in the LTE downlink data receiving range, through an NR antenna spaced apart from the LTE antenna.

For example, referring back to FIG. 13, two SRSs may be simultaneously transmitted through two antennas in a single slot according to the 2T4R transmission configuration. Combinations of two SRSs that can be transmitted in the single slot may be: the first NR antenna 1221 and the second NR antenna 1222, the third NR antenna 1223 and the fourth NR antenna 1224, the first NR antenna 1221 and the third NR antenna 1223, the second NR antenna 1222 and the fourth NR antenna 1224, the first NR antenna 1221 and the fourth NR antenna 1224, and the second NR antenna 1222 and the third NR antenna 1223.

According to an embodiment, when transmitting uplink data through the first LTE antenna 1211 in slot no. 63, the electronic device 101 may be configured such that an SRS is transmitted through one antenna combination among the third NR antenna 1223 and the fourth NR antenna 1224, the first NR antenna 1221 and the third NR antenna 1223, and the first NR antenna 1221 and the fourth NR antenna 1224, which are relatively spaced apart from the first LTE antenna 1221, among the six combinations.

For example, the electronic device 101 may be configured such that SRSs are transmitted through the third NR antenna 1223 and the fourth NR antenna 1224 in slot no. 63, and SRSs are transmitted through the first NR antenna 1221 and the second NR antenna 1222 in slot no. 68. According to an embodiment, the combination of antennas for transmitting the SRSs may be configured to be identically repeated for each single period (for example, 10 slots or 20 slots) or configured differently.

According to an embodiment, the electronic device 101 may be configured such that SRSs are transmitted through the second NR antenna 1222 and the fourth NR antenna 1224 in slot no. 63, and SRSs are transmitted through the first NR antenna 1221 and the third NR antenna 1223 in slot no. 68. Through the above configuration, the electronic device 101 may reduce the influence on LTE signals received through the first LTE antenna 1211 or the second LTE antenna 1212.

According to an embodiment, when transmitting uplink data simultaneously through the first LTE antenna 1211 and the second LTE antenna 1212 in slot no. 63 (for example, in the case of 2-port UL transmission), the electronic device 101 may be configured such that SRSs are transmitted through the first NR antenna 1221 and the third NR antenna 1223 which are relatively spaced apart from the first LTE antenna 1211 and the second LTE antenna 1212.

For example, the electronic device 101 may be configured such that SRSs are transmitted through the first NR antenna 1221 and the third NR antenna 1223 in slot no. 63, SRSs are transmitted through the second NR antenna 1222 and the fourth NR antenna 1224 in slot no. 68, SRSs are transmitted through the first NR antenna 1221 and the fourth NR antenna 1224 in slot no. 73, SRSs are transmitted through the second NR antenna 1222 and the fourth NR antenna 1224 in slot no. 78, SRSs are transmitted through the third NR antenna 1223 and the fourth NR antenna 1224 in slot no. 83, and SRSs are transmitted through the second NR antenna 1222 and the third NR antenna 1223 in slot no. 88.

In the above embodiment, a situation in which a slot or a symbol used to transmit LTE uplink data overlap a slot or a symbol used to transmit an NR SRS, as in the case of slot no. 68, may be avoided, and interference by an SRS may be reduced by configuring the same to be transmitted simultaneously with LTE uplink data through an antenna space apart relatively more from the fourth NR antenna 1224 and the second NR antenna 1222 through which SRSs are transmitted.

Hereinafter, examples of circuit implementation of an electronic device including multiple antennas will be described with reference to FIG. 16, FIG. 17, FIG. 18, and FIG. 19.

Figure 16:
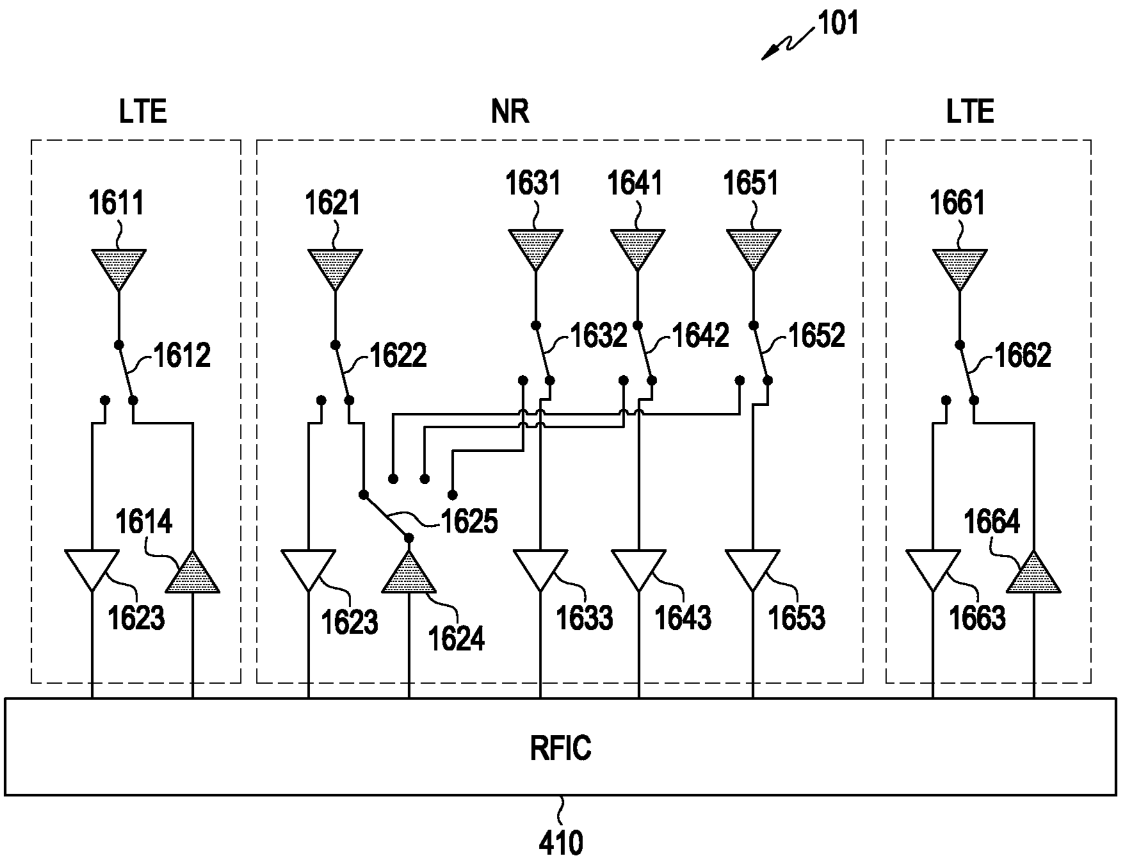
FIG. 16 is a circuit diagram illustrating an electronic device including multiple antennas according to an embodiment.

FIG. 16 is a circuit diagram illustrating an electronic device including multiple antennas according to an embodiment. Referring to FIG. 16, the electronic device 101 may include a first LTE antenna 1611 and a second LTE antenna 1661 in order to transmit/receive LTE data. The electronic device 101 may be configured such that, by controlling a switch 1612 according to a TDD configuration, the first LTE antenna 1611 is connected, directly or indirectly, to a first power amplifier (PA) 1614 during an uplink, and may be configured such that the first LTE antenna 1611 is connected to a first low-noise amplifier (LNA) 1613 during a downlink. The electronic device 101 may be configured such that, by controlling a switch 1622 according to a TDD configuration, the second LTE antenna 1661 is connected to a second power amplifier 1664 during an uplink, and the second LTE antenna 1661 is connected to a second low-noise amplifier 1663 during a downlink. Although the second LTE antenna 1661 is illustrated in FIG. 16 as being able to transmit or receive signals, the second LTE antenna 1661 may be configured to be able to only receive signals according to an embodiment.

According to an embodiment, the electronic device 101 may include a first NR antenna 1621, a second NR antenna 1631, a third NR antenna 1641, and a fourth NR antenna 1651 for the sake of NR data transmission/reception. The electronic device may be configured such that, by controlling a switch 1622, the first NR antenna 1621 is connected, directly or indirectly, to a third power amplifier 1624 during data transmission, and may be configured such that the first antenna 1611 is connected, directly or indirectly, to a third low-noise amplifier 1623 during data reception. The electronic device 101 may be configured such that, by controlling respective switches 1632, 1642, and 1652, the second NR antenna 1631, the third NR antenna 1641, and the fourth NR antenna 1651 are connected, directly or indirectly, to a fourth low-noise amplifier 1633, a fifth low-noise amplifier 1643, and a sixth low-noise amplifier 1653, respectively, during a downlink.

According to an embodiment, the electronic device 101 may transmit data corresponding to an NR communication network to the third power amplifier 1624 through an RFIC 410. The third power amplifier 1624 may amplify data received from the RFIC 410 by a configured value, and may then transmit the amplified data to the first NR antenna 1621 through switches 1625 and 1622. According to an embodiment, downlink data transmitted from an NR base station may be received through the first NR antenna 1621, the second NR antenna 1631, the third NR antenna 1641, and the fourth NR antenna 1651. NR downlink data received through the first NR antenna 1621, the second NR antenna 1631, the third NR antenna 1641, and the fourth NR antenna 1651 may be transmitted to the third low-noise amplifier 1623, the fourth low-noise amplifier 1633, the fifth low-noise amplifier 1643, and the sixth low-noise amplifier 1653 via respective switches 1622, 1632, 1642, 1652, and 1625. The NR downlink data transmitted to the third low-noise amplifier 1623, the fourth low-noise amplifier 1633, the fifth low-noise amplifier 1643, and the sixth low-noise amplifier 1653 may be amplified by a configured value and then transmitted to the RFIC 410. The above operation may enable the electronic device 101 to operate according to 1T4R. According to an embodiment, the electronic device 101 may transmit an SRS successively through the first NR antenna 1621, the second NR antenna 1631, the third NR antenna 1641, and the fourth NR antenna 1651. For example, the electronic device 101 may transmit an SRS from the RFIC 410 to the third power amplifier 1624. The third power amplifier 1624 may amplify the SRS by a configured value, and may transmit the amplified SRS to the first NR antenna 1621, the second NR antenna 1631, the third NR antenna 1641, or the fourth NR antenna 1651 through the NR transmitting switch 1625.

According to an embodiment, the electronic device 101 may control the NR transmitting switch 1625 based on an SRS transmission timepoint configured in Table 1 and Table 2 such that an SRS is transmitted to the NR base station through the first NR antenna 1621, the second NR antenna 1631, the third NR antenna 1641, or the fourth NR antenna 1651. For example, when receiving LTE downlink data through the first LTE antenna 1611 or the second LTE antenna 1661 as illustrated in FIG. 13, the electronic device 101 may control the NR transmitting switch 1625 such that an SRS is transmitted through an NR antenna (for example, the third NR antenna 1641) disposed to be relatively spaced apart from the first LTE antenna 1611 and the second LTE antenna 1661.

Figure 17:
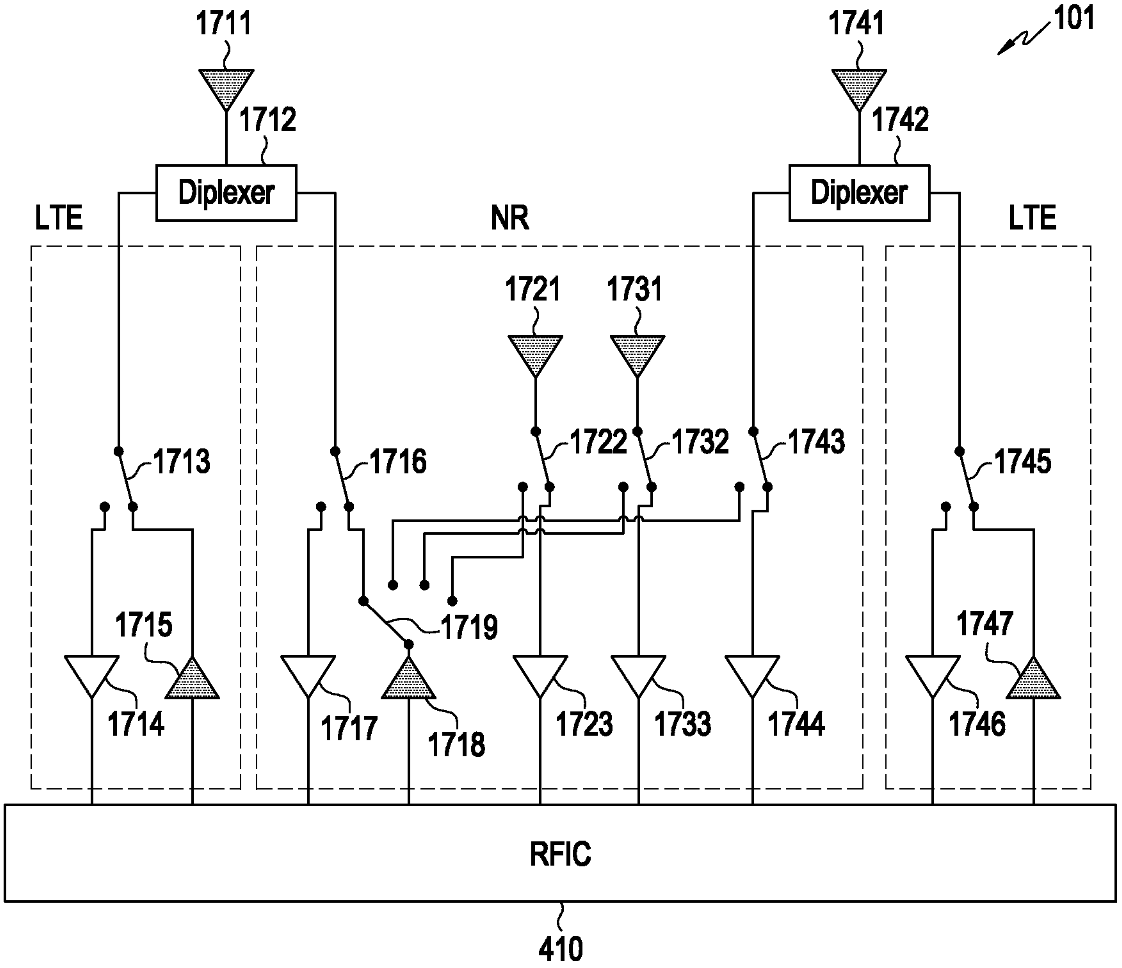
FIG. 17 is a circuit diagram illustrating an electronic device including multiple antennas according to an embodiment.

FIG. 17 is a circuit diagram illustrating an electronic device including multiple antennas according to an embodiment. Referring to FIG. 17, the electronic device 101 may include a first LTE antenna 1711 and a second LTE antenna 1741 in order to transmit/receive LTE data. The electronic device 101 may be configured such that, by controlling a switch 1713 according to a TDD configuration, the first LTE antenna 1711 is connected, directly or indirectly, to a first power amplifier 1715 during an uplink, and may be configured such that the first LTE antenna 1711 is connected to a first low-noise amplifier 1714 during a downlink. The electronic device 101 may be configured such that, by controlling a switch 1745 according to a TDD configuration, the second LTE antenna 1741 is connected to a second power amplifier 1747 during an uplink, and the second LTE antenna 1741 is connected to a second low-noise amplifier 1746 during a downlink.

According to an embodiment, the electronic device 101 may transmit data corresponding to an LTE communication network to the first power amplifier 1715 through an RFIC 410. The first power amplifier 1715 may amplify data received from the RFIC 410 by a configured value, and may then transmit the amplified data to the first LTE antenna 1711 through a switch 1713 and a first diplexer 1712. The electronic device 101 may transmit data corresponding to the LTE communication network to the second power amplifier 1747 through an RFIC 410. The second power amplifier 1747 may amplify data received from the RFIC 410 by a configured value, and may then transmit the amplified data to the second LTE antenna 1741 through a switch 1745 and a first diplexer 1742. Although the second LTE antenna 1741 is illustrated in FIG. 17 as being able to transmit or receive signals, the second LTE antenna 1741 may be configured to be able to only receive signals according to an embodiment.

According to an embodiment, a downlink signal transmitted from an LTE base station may be received through the first LTE antenna 1711 and the second LTE antenna 1741. The LTE downlink signal received through the first LTE antenna 1711 may be transmitted to the first low-noise amplifier 1714 through the first diplexer 1712 and the switch 1713. The first low-noise amplifier 1714 may amplify the received LTE downlink signal by a predetermined value and may transmit the amplified signal to the RFIC 410. The LTE downlink signal received through the second LTE antenna 1741 may be transmitted to the second low-noise amplifier 1746 through the second diplexer 1742 and the switch 1745. The second low-noise amplifier 1746 may amplify the received LTE downlink signal by a predetermined value and may transmit the amplified signal to the RFIC 410.

According to an embodiment, the electronic device 101 may include a first NR antenna 1721 and a second NR antenna 1731 for the sake of NR data transmission/reception. The electronic device 101 may control the switch 1722 such that the first NR antenna 1711 is controlled to be connected to a third power amplifier 1718 during data transmission, and the first NR antenna 1721 is controlled to be connected to a fourth low-noise amplifier 1723 during data reception. The electronic device 101 may control the switches 1732 and 1719 such that the second NR antenna 1731 is controlled to be connected to the third power amplifier 1718 during data transmission, and the second NR antenna 1731 is controlled to be connected to a fifth low-noise amplifier 1733 during data reception.

According to an embodiment, the electronic device 101 may transmit data corresponding to an NR communication network to the third power amplifier 1718 through the RFIC 410. The third power amplifier 1718 may amplify data received from the RFIC 410 by a configured value, and may then transmit the amplified data to the first NR antenna 1721 or the second antenna 1731 through switches 1719, 1722, and 1732. According to an embodiment, a downlink signal transmitted from an NR base station may be received through the first NR antenna 1721, the second NR antenna 1731, the first LTE antenna 1711, and the second LTE antenna 1741. An NR downlink signal received through the first NR antenna 1721 may be transmitted to the fourth low-noise amplifier 1723 through the switch 1722. The fourth low-noise amplifier 1723 may amplify the received NR downlink signal by a configured value and may then transmit the amplified signal to the RFIC 410. An NR downlink signal received through the second NR antenna 1731 may be transmitted to the fifth low-noise amplifier 1733 through the switch 1732. The fifth low-noise amplifier 1733 may amplify the received NR downlink signal by a configured value and may then transmit the amplified signal to the RFIC 410. An NR downlink signal received through the first LTE antenna 1711 may be transmitted to the third low-noise amplifier 1717 through the first diplexer 1712 and the switch 1716. The third low-noise amplifier 1717 may amplify the received NR downlink signal by a configured value and may then transmit the amplified signal to the RFIC 410. An NR downlink signal received through the second LTE antenna 1741 may be transmitted to the sixth low-noise amplifier 1744 through the second diplexer 1742 and the switch 1743. The sixth low-noise amplifier 1744 may amplify the received NR downlink signal by a configured value and may then transmit the amplified signal to the RFIC 410. The above operation may enable the electronic device 101 to operate according to 1T4R.

According to an embodiment, the electronic device 101 may transmit an SRS through the NR transmitting switch 1719 and successively through the first NR antenna 1721, the second NR antenna 1731, the first LTE antenna 1711, and the second LTE antenna 1741. For example, the electronic device 101 may transmit an SRS from the RFIC 410 to the third power amplifier 1718. The third power amplifier 1718 may amplify the SRS by a configured value, and may transmit the amplified SRS to the first NR antenna 1721, the second NR antenna 1731, the first LTE antenna 1711, or the second LTE antenna 1741 through the NR transmitting switch 1719.

According to an embodiment, the electronic device 101 may control the NR transmitting switch 1719 based on an SRS transmission timepoint configured in Table 1 and Table 2 such that an SRS is transmitted to the NR base station through the first NR antenna 1721, the second NR antenna 1731, the first LTE antenna 1711, or the second LTE antenna 1741. For example, when receiving LTE downlink data through the first LTE antenna 1711 as illustrated in FIG. 13, the electronic device 101 may control the NR transmitting switch 1718 such that an SRS is transmitted through an NR antenna (for example, the second NR antenna 1731) disposed to be relatively spaced apart from the first LTE antenna 1711.

Figure 18:
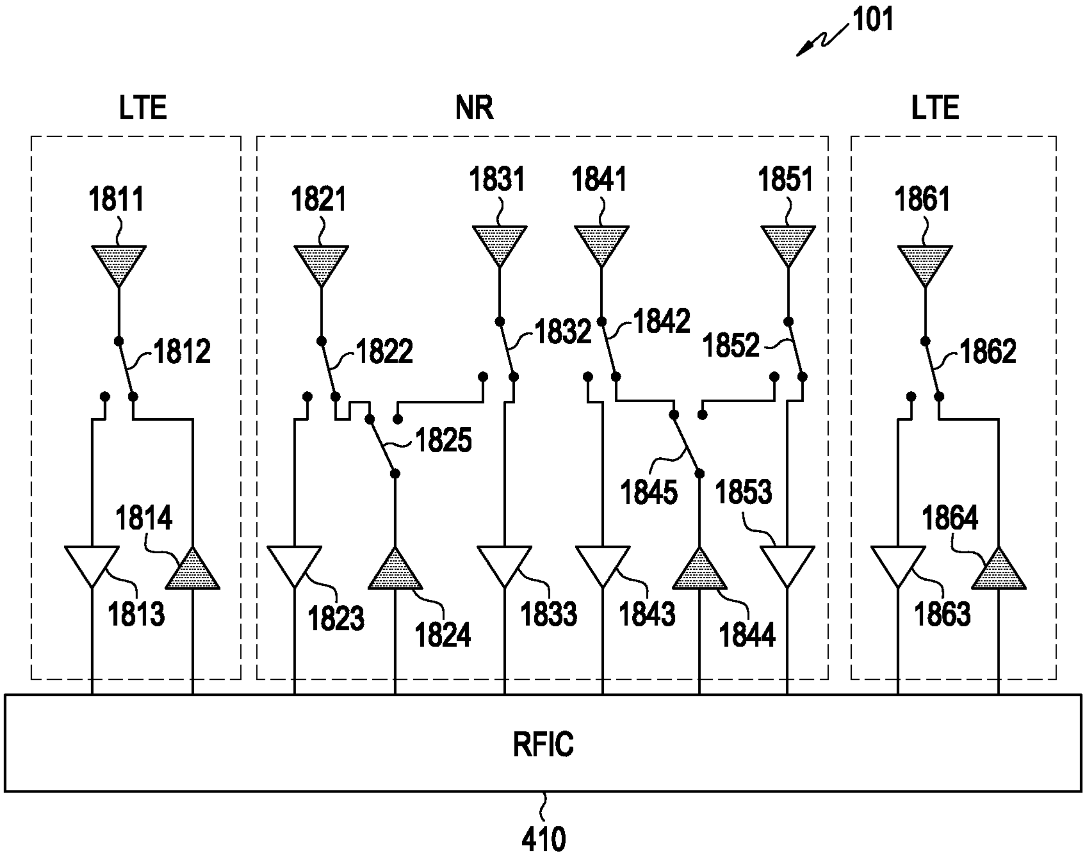
FIG. 18 is a circuit diagram illustrating an electronic device including multiple antennas according to an embodiment.

FIG. 18 is a circuit diagram illustrating an electronic device including multiple antennas according to an embodiment. Referring to FIG. 18, the electronic device 101 may include a first LTE antenna 1811 and a second LTE antenna

1861 in order to transmit/receive LTE data. The electronic device 101 may be configured such that, by controlling a switch 1812 according to a TDD configuration, the first LTE antenna 1811 is connected to a first power amplifier 1814 during an uplink, and may be configured such that the first LTE antenna 1811 is connected to a first low-noise amplifier 1813 during a downlink. The electronic device 101 may be configured such that, by controlling a switch 1862 according to a TDD configuration, the second LTE antenna 1861 is connected to a second power amplifier 1864 during an uplink, and the second LTE antenna 1861 may be connected to a second low-noise amplifier 1863 during a downlink.

According to an embodiment, the electronic device 101 may include a first NR antenna 1821, a second NR antenna 1831, a third NR antenna 1841, and a fourth NR antenna 1851 for the sake of NR data transmission/reception. The electronic device may be configured such that, by controlling a switch 1822, the first NR antenna 1821 is connected to a third power amplifier 1824 during data transmission, and may be configured such that the first antenna 1821 is connected to a third low-noise amplifier 1823 during data reception. The electronic device 101 may be configured such that, by controlling respective switches 1852 and 1845, the second NR antenna 1861 is connected to a fourth low-noise amplifier 1844 during data transmission, and may be configured such that the second antenna 1851 is connected to a sixth low-noise amplifier 1853 during data reception.

The electronic device 101 may be configured to control respective switches 1832 and 1842 such that the second NR antenna 1831 and the third NR antenna 1841 are connected to the fourth low-noise amplifier 1833 and the fifth low-noise amplifier 1843, respectively, during a downlink.

According to an embodiment, the electronic device 101 may simultaneously transmit data corresponding to an NR communication network to the third power amplifier 1824 and the fourth power amplifier 1844 through the RFIC 410. The third power amplifier 1824 may amplify data received from the RFIC 410 by a configured value, and may then transmit the amplified data to the first NR antenna 1821 through switches 1825 and 1822. The fourth power amplifier 1844 may amplify data received from the RFIC 410 by a configured value, and may then transmit the amplified data to the fourth NR antenna 1851 through switches 1845 and 1852.

According to an embodiment, downlink data transmitted from an NR base station may be received through the first NR antenna 1821, the second NR antenna 1831, the third NR antenna 1841, and the fourth NR antenna 1851. NR downlink data received through the first NR antenna 1821, the second NR antenna 1831, the third NR antenna 1841, and the fourth NR antenna 1851 may be transmitted to the third low-noise amplifier 1823, the fourth low-noise amplifier 1833, the fifth low-noise amplifier 1843, and the sixth low-noise amplifier 1853 via respective switches 1822, 1832, 1842, 1852, 1825, and 1845. The NR downlink data transmitted to the third low-noise amplifier 1823, the fourth low-noise amplifier 1833, the fifth low-noise amplifier 1843, and the sixth low-noise amplifier 1853 may be amplified by a configured value and then transmitted to the RFIC 410. The above operation may enable the electronic device 101 to operate according to 2T4R. According to an embodiment, the electronic device 101 may transmit an SRS successively through the first NR antenna 1821, the second NR antenna 1831, the third NR antenna 1841, and the fourth NR antenna 1851. For example, the electronic device 101 may transmit an SRS from the RFIC 410 to the third power amplifier 1824. The third power amplifier 1824 may amplify the SRS by a configured value, and may transmit the amplified SRS to the first NR antenna 1821 or the second NR antenna 1831 through the first NR transmitting switch 1825. The electronic device 101 may transmit an SRS from the RFIC 410 to the fourth power amplifier 1844. The fourth power amplifier 1844 may amplify the SRS by a configured value, and may transmit the amplified SRS to the third NR antenna 1841 or the fourth NR antenna 1851 through the second NR transmitting switch 1845. According to an embodiment, when operating according to "2T4R", the electronic device 101 may simultaneously transmit two SRSs (for example, a first SRS and a second SRS) from the RFIC 410 to the third power amplifier 1824 and the fourth power amplifier 1844. For example, the electronic device 101 may transmit a first SRS amplified through the third power amplifier 1824 to the first NR antenna 1821 or the second NR antenna 1831 and may simultaneously transmit a second SRS amplified through the fourth power amplifier 1844 to the third NR antenna 1841 or the fourth NR antenna 1851. According to an embodiment, the electronic device 101 may control the first NR transmitting switch 1825 or the second NR transmitting switch 1845, based on an SRS transmission time-point configured in Table 1 and Table 2, such that an SRS is transmitted to the NR base station through the first NR antenna 1821, the second NR antenna 1831, the third NR antenna 1841, or the fourth NR antenna 1851. For example, when receiving LTE downlink data through the first LTE antenna 1811 or the second LTE antenna 1861 as illustrated in FIG. 13, the electronic device 101 may control the first NR transmitting switch 1825 and the second NR transmitting switch 1845 such that an SRS is transmitted through an NR antenna (for example, the first NR antenna 1821 and the third NR antenna 1841) disposed to be relatively spaced apart from the first LTE antenna 1811 and the second LTE antenna 1861.

Figure 19:
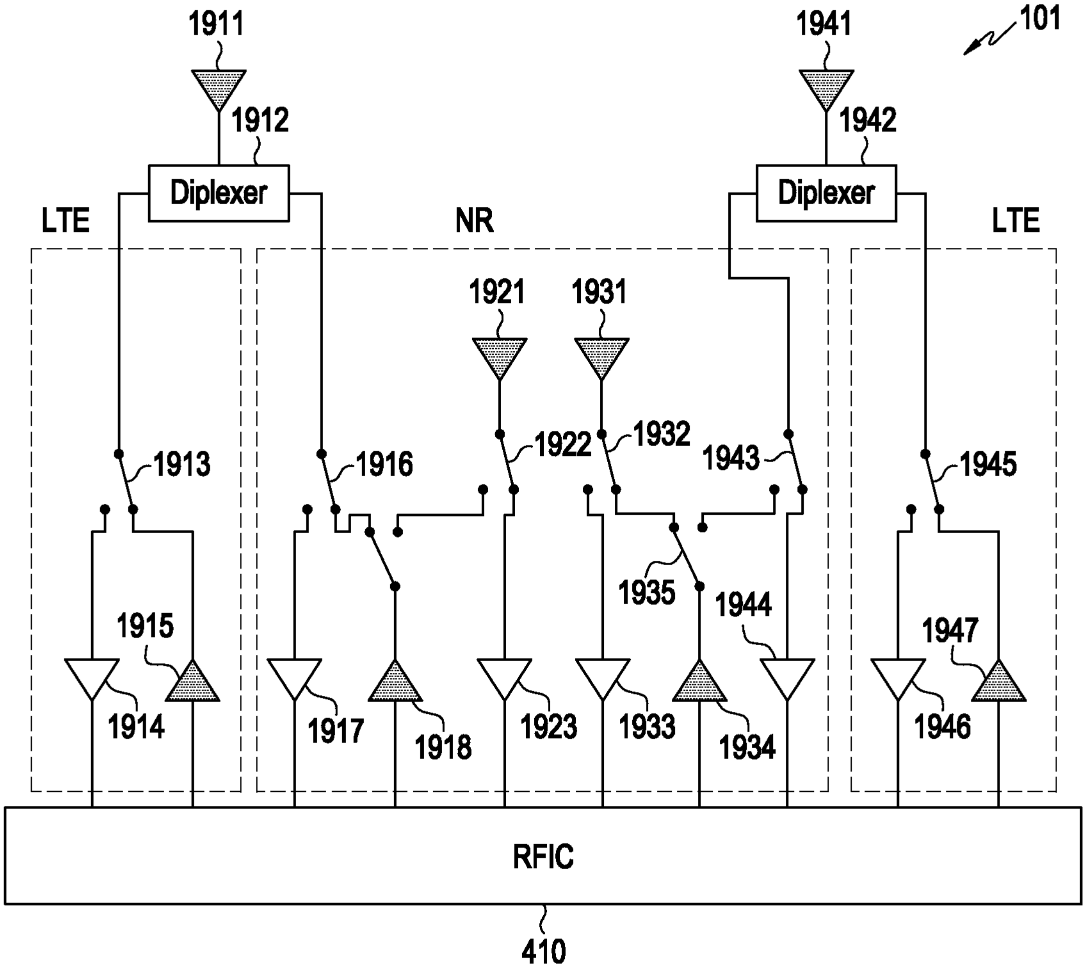
FIG. 19 is a circuit diagram illustrating an electronic device including multiple antennas according to an embodiment.

FIG. 19 is a circuit diagram illustrating an electronic device including multiple antennas according to an embodiment. Referring to FIG. 19, the electronic device 101 may include a first LTE antenna 1911 and a second LTE antenna 1941 in order to transmit/receive LTE data. The electronic device 101 may be configured such that, by controlling a switch 1913 according to a TDD configuration, the first LTE antenna 1911 is connected, directly or indirectly, to a first power amplifier 1915 during an uplink, and may be configured such that the first LTE antenna 1911 is connected, directly or indirectly, to a first low-noise amplifier 1914 during a downlink. The electronic device 101 may be configured such that, by controlling a switch 1945 according to a TDD configuration, the second LTE antenna 1941 is connected, directly or indirectly, to a second power amplifier 1947 during an uplink, and may be configured such that the second LTE antenna 1941 is connected, directly or indirectly, to a second low-noise amplifier 1946 during a downlink.

According to an embodiment, the electronic device 101 may transmit data corresponding to an LTE communication network to the first power amplifier 1915 through an RFIC 410. The first power amplifier 1915 may amplify data received from the RFIC 410 by a configured value, and may then transmit the amplified data to the first LTE antenna 1911 through a switch 1913 and a first diplexer 1912. The electronic device 101 may transmit data corresponding to the LTE communication network to the second power amplifier 1947 through the RFIC 410. The second power amplifier 1947 may amplify data received from the RFIC 410 by a configured value, and may then transmit the amplified data to the second LTE antenna 1941 through a switch 1945 and a second diplexer 1942.

According to an embodiment, a downlink signal transmitted from an LTE base station may be received through the first LTE antenna 1911 and the second LTE antenna 1941. The LTE downlink signal received through the first LTE antenna 1911 may be transmitted to the first low-noise amplifier 1914 through the first diplexer 1912 and the switch 1913. The first low-noise amplifier 1914 may amplify the received LTE downlink signal by a predetermined value and may transmit the amplified signal to the RFIC 410. The LTE downlink signal received through the second LTE antenna 1941 may be transmitted to the second low-noise amplifier 1946 through the second diplexer 1942 and the switch 1945. The second low-noise amplifier 1946 may amplify the received LTE downlink signal by a predetermined value and may transmit the amplified signal to the RFIC 410.

According to an embodiment, the electronic device 101 may include a first NR antenna 1921 and a second NR antenna 1931 for the sake of NR data transmission/reception. The electronic device 101 may control the switches 1919 and 1922 such that the first NR antenna 1921 is controlled to be connected to a third power amplifier 1918 during data transmission, and the first NR antenna 1921 is controlled to be connected to a fourth low-noise amplifier 1923 during data reception. The electronic device 101 may control the switches 1932 and 1935 such that the second NR antenna 1931 is controlled to be connected to a fourth power amplifier 1934 during data transmission, and the second NR antenna 1931 is controlled to be connected to a fifth low-noise amplifier 1933 during data reception.

According to an embodiment, the electronic device 101 may simultaneously transmit data corresponding to an NR communication network to the third power amplifier 1918 and the fourth power amplifier 1934 through the RFIC 410. The third power amplifier 1918 may amplify data received from the RFIC 410 by a configured value, and may then transmit the amplified data to the first NR antenna 1921 through switches 1919 and 1922. The fourth power amplifier 1934 may amplify data received from the RFIC 410 by a configured value, and may then transmit the amplified data to the second NR antenna 1931 through switches 1935 and 1932.

According to an embodiment, a downlink signal transmitted from an NR base station may be received through the first NR antenna 1921, the second NR antenna 1931, the first LTE antenna 1912, and the second LTE antenna 1941. An NR downlink signal received through the first NR antenna 1921 may be transmitted to the fourth low-noise amplifier 1923 through the switch 1922. The fourth low-noise amplifier 1923 may amplify the received NR downlink signal by a configured value and may then transmit the amplified signal to the RFIC 410. An NR downlink signal received through the second NR antenna 1931 may be transmitted to the fifth low-noise amplifier 1933 through the switch 1932. The fifth low-noise amplifier 1933 may amplify the received NR downlink signal by a configured value and may then transmit the amplified signal to the RFIC 410. An NR downlink signal received through the first LTE antenna 1911 may be transmitted to the third low-noise amplifier 1917 through the first diplexer 1912 and the switch 1916. The third low-noise amplifier 1917 may amplify the received NR downlink signal by a configured value and may then transmit the amplified signal to the RFIC 410. An NR downlink signal received through the second LTE antenna 1941 may be transmitted to the sixth low-noise amplifier 1944 through the second diplexer 1942 and the switch 1943. The sixth low-noise amplifier 1944 may amplify the received NR downlink signal by a configured value and may then transmit the amplified signal to the RFIC 410. The above operation may enable the electronic device 101 to operate according to 2T4R.

According to an embodiment, the electronic device 101 may transmit an SRS successively through the first NR antenna 1921, the second NR antenna 1931, the first LTE antenna 1911, and the second LTE antenna 1941 by controlling the first NR transmitting switch 1919 and the second NR transmitting switch 1935. For example, the electronic device 101 may transmit an SRS from the RFIC 410 to the third power amplifier 1918. The third power amplifier 1918 may amplify the SRS by a configured value, and may transmit the amplified SRS to the first NR antenna 1921 or the first LTE antenna 1911 through the first NR transmitting switch 1919. The electronic device 101 may transmit an SRS from the RFIC 410 to the fourth power amplifier 1934. The fourth power amplifier 1934 may amplify the SRS by a configured value, and may transmit the amplified SRS to the second NR antenna 1931 or the second LTE antenna 1941 through the second NR transmitting switch 1935. According to an embodiment, when operating according to "2T4R", the electronic device 101 may simultaneously transmit two SRSs (for example, a first SRS and a second SRS) from the RFIC 410 to the third power amplifier 1918 and the fourth power amplifier 1934. For example, the electronic device 101 may transmit a first SRS amplified through the third power amplifier 1918 to the first NR antenna 1921 or the first LTE antenna 1911 and may simultaneously transmit a second SRS amplified through the fourth power amplifier 1934 to the second NR antenna 1931 or the second LTE antenna 1941.

According to an embodiment, the electronic device 101 may control the first NR transmitting switch 1919 or the second NR transmitting switch 1935, based on an SRS transmission timepoint configured in Table 1 and Table 2, such that an SRS is transmitted to the NR base station through the first NR antenna 1921, the second NR antenna 1931, the first LTE antenna 1911, or the second LTE antenna 1941. For example, when receiving LTE downlink data through the first LTE antenna 1911 as illustrated in FIG. 13, the electronic device 101 may control the second NR transmitting switch 1935 such that an SRS is transmitted through an NR antenna (for example, the second NR antenna 1931) disposed to be relatively spaced apart from the first LTE antenna 1911.

Figure 20:
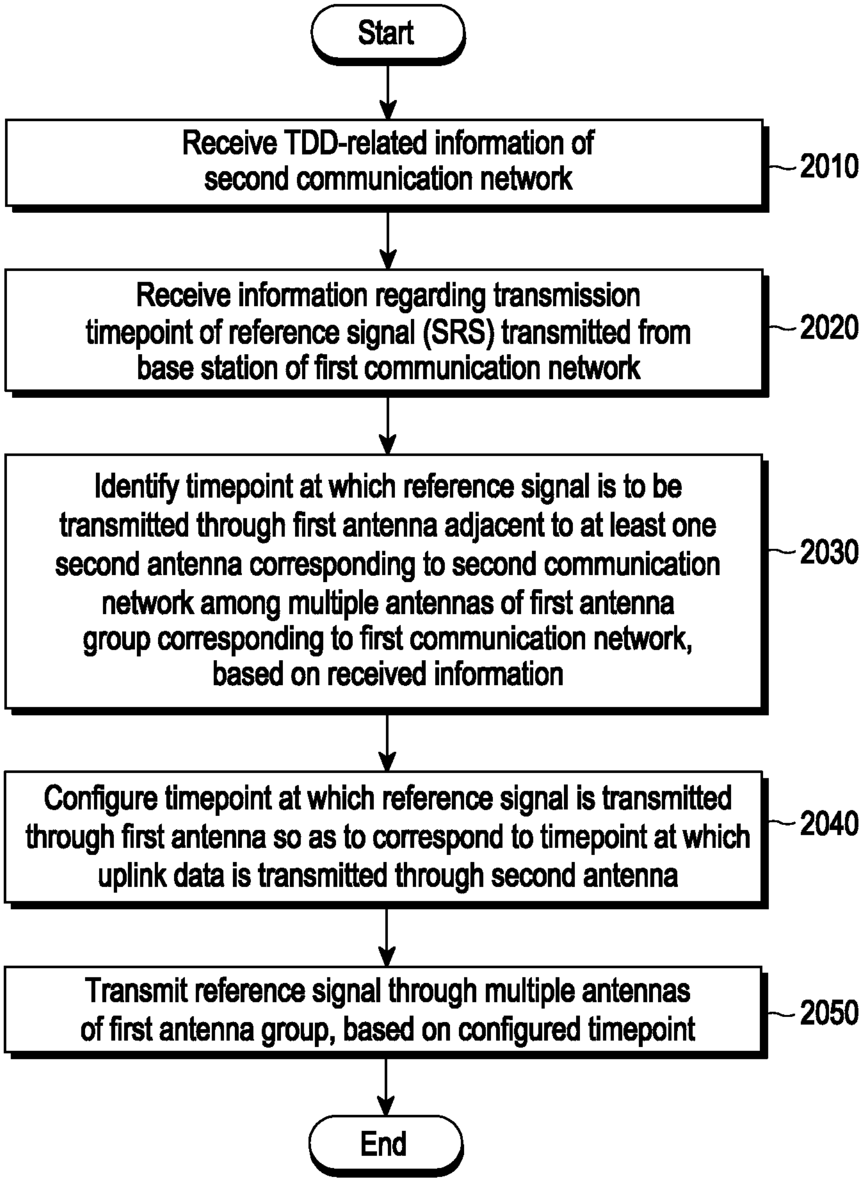
FIG. 20 is a flowchart illustrating a method for operating an electronic device according to an embodiment.

FIG. 20 is a flowchart illustrating a method for operating an electronic device according to an embodiment. According to an embodiment, the electronic device 101 may include a communication processor, at least one radio frequency integrated circuit (RFIC) connected, directly or indirectly, to the communication processor, a first antenna group including multiple antennas connected, directly or indirectly, to the at least one RFIC so as to transmit or receive data of a first communication network (for example, NR communication network), and a second antenna group including multiple antennas connected, directly or indirectly, to the at least one RFIC so as to transmit or receive data of a second communication network (for example, LTE communication network).

Referring to FIG. 20, the electronic device 101 (for example, the first communication processor 212 in FIG. 2A, the second communication processor 214 in FIG. 2A, or the integrated communication processor 260 in FIG. 2B) may receive TDD-related information from a base station (for example, an LTE base station) of the second communication network in operation 2010. According to an embodiment, the TDD-related information may be transmitted through system information block (SIB) 1 which is broadcast from the base station as described above with reference to Table 3 in connection with 3GPP standard document TS 36.331.

According to an embodiment, the electronic device 101 (for example, the first communication processor 212 in FIG. 2A, the second communication processor 214 in FIG. 2A, or the integrated communication processor 260 in FIG. 2B) may receive information regarding the transmission timepoint of a reference signal transmitted from a base station (for example, an NR base station) of the first communication network in operation 2020. For example, the information regarding the transmission timepoint of a reference signal may be received in a format as described above with reference to Table 1 and Table 2.

According to an embodiment, the electronic device 101 (for example, the first communication processor 212 in FIG. 2A, the second communication processor 214 in FIG. 2A, or the integrated communication processor 260 in FIG. 2B) may identify, based on the received information, the timepoint at which the reference signal is transmitted through a first antenna adjacent to a second antenna of the second antenna group, among the multiple antennas of the first antenna group, in operation 2030.

According to an embodiment, the electronic device 101 (for example, the first communication processor 212 in FIG. 2A, the second communication processor 214 in FIG. 2A, or the integrated communication processor 260 in FIG. 2B) may configure a timepoint at which a reference signal is transmitted through the first antenna so as to correspond to a timepoint at which uplink data is transmitted through the second antenna in operation 2040.

According to an embodiment, the electronic device 101 (for example, the first communication processor 212 in FIG. 2A, the second communication processor 214 in FIG. 2A, or the integrated communication processor 260 in FIG. 2B) may control the reference signal to be transmitted through the first antenna, based on the configured timepoint at which the reference signal is transmitted, in operation 2050.

Figure 21:
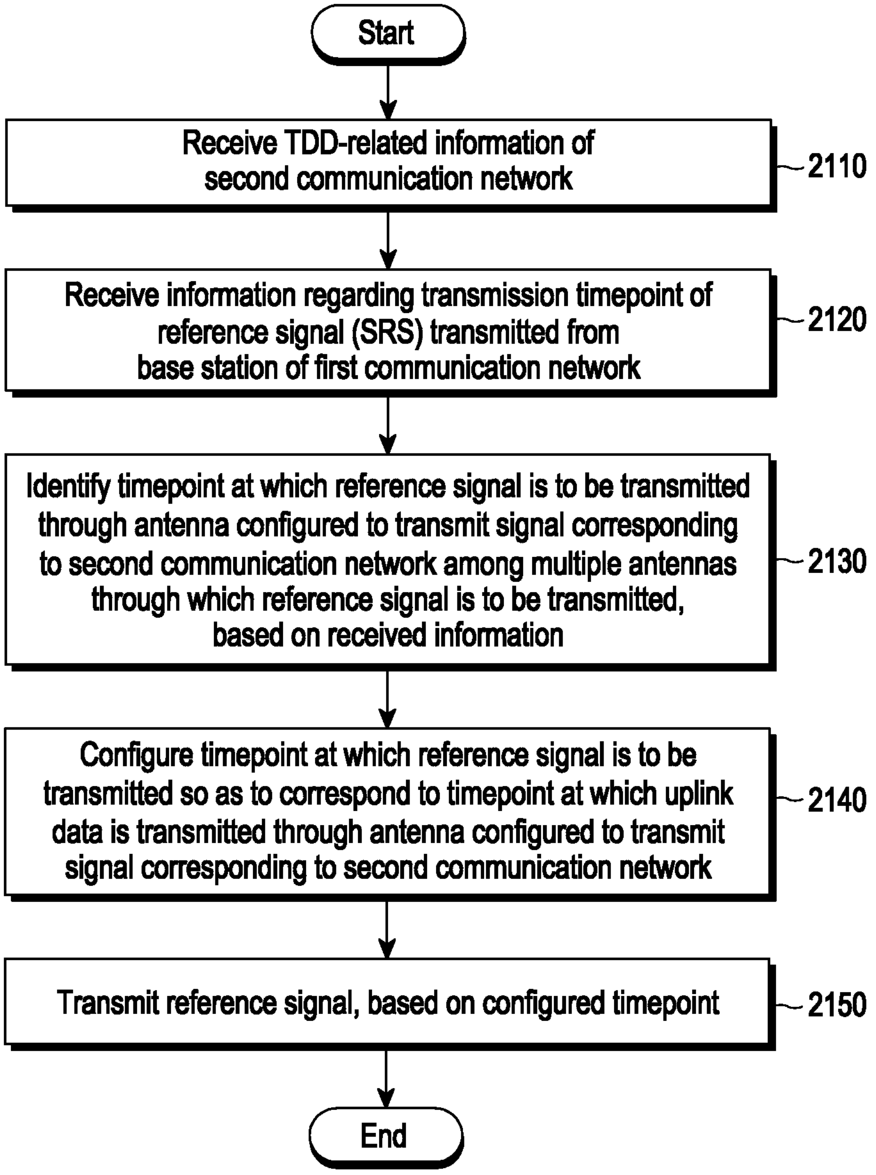
FIG. 21 is a flowchart illustrating a method for operating an electronic device according to an embodiment.

FIG. 21 is a flowchart illustrating a method for operating an electronic device according to an embodiment. According to an embodiment, the electronic device 101 may include a communication processor, at least one radio frequency integrated circuit (RFIC) connected to the communication processor, and multiple antennas connected to the at least one RFIC so as to transmit or receive data corresponding to at least one of a first communication network (for example, an NR communication network) or a second communication network (for example, an LTE communication network).

Referring to FIG. 21, the electronic device 101 (for example, the first communication processor 212 in FIG. 2A, the second communication processor 214 in FIG. 2A, or the integrated communication processor 260 in FIG. 2B) may receive TDD-related information from a base station (for example, an LTE base station) of the second communication network in operation 2110. According to an embodiment, the TDD-related information may be transmitted through system information block (SIB) 1 which is broadcast from the base station as described above with reference to Table 3 in connection with 3GPP standard document TS 36.211.

According to an embodiment, the electronic device 101 (for example, the first communication processor 212 in FIG. 2A, the second communication processor 214 in FIG. 2A, or the integrated communication processor 260 in FIG. 2B) may receive information regarding the transmission timepoint of a reference signal transmitted from a base station (for example, an NR base station) of the first communication network in operation 2120. For example, the information regarding the transmission timepoint of a reference signal may be received in a format as described above with reference to Table 1 and Table 2.

According to an embodiment, the electronic device 101 (for example, the first communication processor 212 in FIG. 2A, the second communication processor 214 in FIG. 2A, or the integrated communication processor 260 in FIG. 2B) may identify, based on the received information, the timepoint at which the reference signal is to be transmitted through an antenna configured to transmit a signal corresponding to the second communication network, among multiple antennas through which the reference signal is to be transmitted, in operation 2130.

According to an embodiment, the electronic device 101 (for example, the first communication processor 212 in FIG. 2A, the second communication processor 214 in FIG. 2A, or the integrated communication processor 260 in FIG. 2B) may configure a timepoint at which the reference signal is to be transmitted so as to correspond to a timepoint at which uplink data is transmitted through an antenna configured to transmit a signal corresponding to the second communication network in operation 2140.

According to an embodiment, the electronic device 101 (for example, the first communication processor 212 in FIG. 2A, the second communication processor 214 in FIG. 2A, or the integrated communication processor 260 in FIG. 2B) may control the reference signal to be transmitted, based on the configured timepoint, in operation 2150.

An electronic device according to one of various embodiments may include a communication processor, at least one radio frequency integrated circuit (RFIC) connected to the communication processor, a first antenna group including a plurality of antennas connected to the at least one RFIC to transmit or receive data of a first communication network, and a second antenna group including a plurality of antennas connected to the at least one RFIC to transmit or receive data of a second communication network. The communication processor may receive, from a first base station corresponding to the first communication network or a second base station corresponding to the second communication network, first information regarding a transmission timepoint of a reference signal transmitted to the first base station, receive, from the second base station, second information regarding a timepoint at which data of the second communication network is transmitted/received, and select, at and/or proximate a timepoint at which uplink data is transmitted to the second base station through a second antenna of the second antenna group, a first antenna adjacent to the second antenna, among the plurality of antennas of the first antenna group, and control to transmit the reference signal to the first base station, based on the received first information and the received second information.

According to an embodiment, the reference signal may include a sounding reference signal (SRS) used for multi-antenna signal processing based on uplink channel state measurement.

According to an embodiment, the communication processor may control to transmit information related to antenna switching to the first base station.

According to an embodiment, the communication processor may receive information about a timepoint at which the uplink data is transmitted through system information which is broadcast from the second base station.

According to an embodiment, the communication processor may be configured to transmit another reference signal different from the reference signal through at least one antenna among the first antenna group adjacent to a fourth antenna capable of using for reception among the second antenna group at and/or proximate a timepoint at which uplink data is transmitted through a third antenna among the second antenna group.

According to an embodiment, the communication processor may store information corresponding to the configured timepoint at which the reference signal is transmitted in a memory in a table type.

According to an embodiment, the timepoint at which the uplink data is transmitted may correspond to one of an uplink subframe or a special subframe in a time division duplex (TDD) configuration regarding the second communication network.

According to an embodiment, the communication processor may be configured to control the reference signal to be simultaneously transmitted through the plurality of antennas among the first antenna group at and/or proximate the timepoint of transmitting the reference signal.

An electronic device according to one of various embodiments may include a communication processor, at least one radio frequency integrated circuit (RFIC) connected to the communication processor, and a plurality of antennas connected to the at least one RFIC to transmit or receive data corresponding to at least one of a first communication network or a second communication network. The communication processor may receive, from a first base station corresponding to the first communication network or a second base station corresponding to the second communication network, first information about a transmission timepoint of a reference signal transmitted to the first base station, receive, from the second base station, second information about a timepoint at which data of the second communication network is transmitted/received, identify a timepoint at which the reference signal is to be transmitted through an antenna configured to transmit a signal corresponding to the second communication network, among the plurality of antennas configured to transmit the reference signal, based on the received first information and the received second information, configure a timepoint at which a reference signal is to be transmitted through the antenna to correspond to a timepoint at which uplink data corresponding to the second communication network is transmitted, and control to transmit the reference signal to the first base station through the antenna, based on the configured timepoint at which the reference signal is transmitted.

According to an embodiment, the reference signal may include a sounding reference signal (SRS) used for multi-antenna signal processing based on uplink channel state measurement.

A method according to one of various embodiments may be a method for transmitting a reference signal by an electronic device including a communication processor, at least one radio frequency integrated circuit (RFIC) connected to the communication processor, a first antenna group including a plurality of antennas connected to the at least one RFIC to transmit or receive data of a first communication network, and a second antenna group including a plurality of antennas connected to the at least one RFIC to transmit or receive data of a second communication network. The method may include the operations of receiving, from a first base station corresponding to the first communication network or a second base station corresponding to the second communication network, first information about a transmission timepoint of a reference signal transmitted to the first base station, receiving, from the second base station, second information about a timepoint at which data of the second communication network is transmitted/received, and selecting, at and/or proximate a timepoint at which uplink data is transmitted to the second base station through a second antenna of the second antenna group, a first antenna adjacent to the second antenna, among the plurality of antennas of the first antenna group, and transmitting the reference signal to the first base station, based on the received first information and the received second information.

According to an embodiment, the reference signal may include a sounding reference signal (SRS) used for multi-antenna signal processing based on uplink channel state measurement.

According to an embodiment, the method may further include an operation of transmitting information related to antenna switching capability to the first base station.

According to an embodiment, the method may further include an operation of receiving information regarding a timepoint at which the uplink data is transmitted through system information which is broadcast from the second base station.

According to an embodiment, the method may be configured such that, at and/or proximate a timepoint at which uplink data is transmitted through a third antenna among the second antenna group, a reference signal different from the reference signal is transmitted through at least one antenna among the first antenna group adjacent to a fourth antenna which may be used for reception among the second antenna group.

According to an embodiment, information corresponding to the configured timepoint at which the reference signal is transmitted may be stored in a memory in a table type.

According to an embodiment, the timepoint at which the uplink data is transmitted may correspond to one of an uplink subframe or a special subframe in a time division duplex (TDD) configuration regarding the second communication network.

According to an embodiment, the method may include an operation of transmitting, at and/or proximate a timepoint at which the reference signal is transmitted, the reference signal simultaneously transmitted through multiple antennas among the first antenna group.

A method for operating an electronic device according to one of various embodiments may be a method for transmitting a reference signal by an electronic device including a communication processor, at least one radio frequency integrated circuit (RFIC) connected to the communication processor, and a plurality of antennas connected to the at least one RFIC to transmit or receive data corresponding to at least one of a first communication network or a second communication network. The method may include the operations of receiving, from a first base station corresponding to the first communication network or a second base station corresponding to the second communication network, first information a transmission timepoint of a reference signal transmitted to the first base station, receiving, from the second base station, second information about a timepoint at which data of the second communication network is transmitted/received, identifying a timepoint at which the reference signal is to be transmitted through an antenna configured to transmit a signal corresponding to the second communication network, among the plurality of antennas configured to transmit the reference signal, based on the received first information and the received second information, configuring a timepoint at which a reference signal is to be transmitted through the antenna to correspond to a timepoint at which uplink data corresponding to the second communication network is transmitted, and transmitting the reference signal to the first base station through the antenna, based on the configured timepoint at which the reference signal is transmitted. "Based on" as used herein covers based at least on.

According to an embodiment, the reference signal may include a sounding reference signal (SRS) used for multi-antenna signal processing based on uplink channel state measurement.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

at least one communication processor comprising processor circuitry;

at least one radio frequency integrated circuit (RFIC) connected to the at least one communication processor;

a first antenna group, comprising a plurality of antennas, connected to the at least one RFIC to transmit or receive data of a first communication network; and a second antenna group, comprising a plurality of antennas, connected to the at least one RFIC to transmit or receive data of a second communication network, wherein the first communication network supports a first access technology and the second communication network supports a second access technology that is a different from the first access technology, the first antenna group and the second antenna group being distinct from one another;

wherein the communication processor is configured, individually or collectively to:

receive, from a first base station corresponding to the first communication network and/or a second base station corresponding to the second communication network, first information regarding a transmission timepoint of a reference signal to be transmitted to the first base station;

receive, from the second base station, second information regarding a timepoint at which data of the second communication network is transmitted and/or received; and select a first antenna relatively spaced apart from a second antenna, among the plurality of antennas of the first antenna group, and control to transmit, at a timepoint at which uplink data is transmitted to the second base station through the second antenna of the second antenna group, the reference signal to the first base station via the selected first antenna, based on the received first information and the received second information.

2. The electronic device of claim 1, wherein the reference signal comprises a sounding reference signal (SRS) to be used for multi-antenna signal processing based on uplink channel state measurement.

3. The electronic device of claim 1, wherein the at least one communication processor is configured, individually or collectively, to control to transmit information related to antenna switching capability to the first base station.

4. The electronic device of claim 1, wherein the at least one communication processor is configured, individually or collectively, to receive information regarding a timepoint at which the uplink data is transmitted through system information which is broadcast from the second base station.

5. The electronic device of claim 1, wherein the at least one communication processor is configured, individually or collectively, to control to transmit another reference signal different from the reference signal through at least one antenna among the first antenna group adjacent to a fourth antenna capable of using for reception among the second antenna group proximate a timepoint at which uplink data is transmitted through a third antenna among the second antenna group.

6. The electronic device of claim 1, wherein the at least one communication processor is configured, individually or collectively, to store mapping information between the configured timepoint at which the reference signal is transmitted and an antenna in a memory in a table type.

7. The electronic device of claim 1, wherein the timepoint at which the uplink data is transmitted corresponds to at least one of an uplink subframe or a special subframe in a time division duplex (TDD) configuration about regarding the second communication network.

8. The electronic device of claim 1, wherein the at least one communication processor is configured, individually or collectively, to control the reference signal to be simultaneously transmitted through the plurality of antennas among the first antenna group at the timepoint of transmitting the reference signal.

9. An electronic device comprising:

at least one communication processor comprising processing circuitry;

at least one radio frequency integrated circuit (RFIC) connected to the at least one communication processor; and a plurality of antennas connected to the at least one RFIC to transmit or receive data corresponding to at least one of a first communication network or a second communication network, wherein the at least one communication processor is configured, individually or collectively, to:

receive, from a first base station corresponding to the first communication network or a second base station corresponding to the second communication network, first information regarding a transmission timepoint of a reference signal transmitted to the first base station, receive, from the second base station, second information regarding a timepoint at which data of the second communication network is transmitted or received, wherein the first communication network supports a first access technology and the second communication network supports a second access technology that is a different from the first access technology;

identify a timepoint at which the reference signal is to be transmitted through an antenna configured to transmit a signal corresponding to the second communication network, among the plurality of antennas configured to transmit the reference signal, based on the received first information and the received second information, configure a timepoint at which a reference signal is to be transmitted through the antenna to correspond to a timepoint at which uplink data corresponding to the second communication network is transmitted; and control to transmit the reference signal to the first base station through the antenna, based on the configured timepoint at which the reference signal is transmitted.

10. The electronic device of claim 9, wherein the reference signal comprises a sounding reference signal (SRS) to be used for multi-antenna signal processing based on uplink channel state measurement.

11. A method for transmitting a reference signal by an electronic device comprising a communication processor, at least one radio frequency integrated circuit (RFIC) connected to the communication processor, a first antenna group comprising a plurality of antennas connected to the at least one RFIC to transmit or receive data of a first communication network, and a second antenna group comprising a plurality of antennas connected to the at least one RFIC to transmit or receive data of a second communication network, wherein the first communication network supports a first access technology and the second communication network supports a second access technology that is a different from the first access technology, the first antenna group and the second antenna group being distinct from one another, the method comprising:

receiving, from a first base station corresponding to the first communication network and/or a second base station corresponding to the second communication network, first information regarding a transmission timepoint of a reference signal transmitted to the first base station;

receiving, from the second base station, second information regarding a timepoint at which data of the second communication network is transmitted and/or received; and selecting a first antenna relatively spaced apart from a second antenna, among the plurality of antennas of the first antenna group, and transmitting, at a timepoint at which uplink data is transmitted to the second base station through the second antenna of the second antenna group, the reference signal to the first base station via the selected first antenna, based on the received first information and the received second information.

12. The method of claim 11, wherein the reference signal comprises a sounding reference signal (SRS) used for multi-antenna signal processing based on uplink channel state measurement.

13. The method of claim 11, further comprising transmitting information related to antenna switching capability to the first base station.

14. The method of claim 11, further comprising receiving information regarding a timepoint at which the uplink data is transmitted through system information which is broadcast from the second base station.

15. The method of claim 11, further comprising transmitting another reference signal different from the reference signal through at least one antenna among the first antenna group adjacent to a fourth antenna capable of using for reception among the second antenna group proximate a timepoint at which uplink data is transmitted through a third antenna among the second antenna group.

16. The method of claim 11, further comprising:

mapping information between the configured timepoint at which the reference signal is transmitted and an antenna is stored in a memory in a table type.

17. The method of claim 11, wherein the timepoint at which the uplink data is transmitted corresponds to at least one of an uplink subframe or a special subframe in a time division duplex (TDD) configuration about the second communication network.

18. The method of claim 11, further comprising controlling the reference signal to be simultaneously transmitted through the plurality of antennas among the first antenna group at the timepoint of transmitting the reference signal.

19. A method for transmitting a reference signal by an electronic device comprising a communication processor, at least one radio frequency integrated circuit (RFIC) connected to the communication processor, a first antenna group comprising a plurality of antennas connected to the at least one RFIC to transmit or receive data of a first communication network, and a second antenna group comprising a plurality of antennas connected to the at least one RFIC to transmit or receive data of a second communication network, wherein the first communication network supports a first access technology and the second communication network supports a second access technology that is a different from the first access technology, the first antenna group and the second antenna group being distinct from one another, the method comprising:

receiving, from a first base station corresponding to the first communication network or a second base station corresponding to the second communication network, first information a transmission timepoint of a reference signal transmitted to the first base station, receiving, from the second base station, second information about a timepoint at which data of the second communication network is transmitted or received, identifying a timepoint at which the reference signal is to be transmitted through an antenna configured to transmit a signal corresponding to the second communication network, among the plurality of antennas configured to transmit the reference signal, based on the received first information and the received second information, configuring a timepoint at which a reference signal is to be transmitted through the antenna to correspond to a timepoint at which uplink data corresponding to the second communication network is transmitted, and transmitting the reference signal to the first base station through the antenna, based on the configured timepoint at which the reference signal is transmitted.

20. The method of claim 19, wherein the reference signal comprises a sounding reference signal (SRS) to be used for multi-antenna signal processing based on uplink channel state measurement.

* * * * *